(12) United States Patent
Saitou

(10) Patent No.: US 7,053,914 B2
(45) Date of Patent: May 30, 2006

(54) GRAPHIC EDITING DEVICE, GRAPHIC EDITING METHOD AND STORAGE MEDIUM FOR STORING A PROGRAM

(75) Inventor: Nobuhiro Saitou, Tokyo (JP)

(73) Assignee: Fujitsu Limited, Kawasaki (JP)

( * ) Notice: Subject to any disclaimer, the term of this patent is extended or adjusted under 35 U.S.C. 154(b) by 356 days.

(21) Appl. No.: 09/739,840

(22) Filed: Dec. 20, 2000

(65) Prior Publication Data
US 2001/0010518 A1    Aug. 2, 2001

(30) Foreign Application Priority Data
Jan. 31, 2000    (JP)    ............... 2000-021979

(51) Int. Cl.
G09G 5/00    (2006.01)
(52) U.S. Cl. ............... 345/619; 345/620; 345/629; 345/440; 345/443
(58) Field of Classification Search ............... 345/619, 345/620, 624, 629, 630, 440
See application file for complete search history.

(56) References Cited

U.S. PATENT DOCUMENTS
5,432,897 A * 7/1995 Tatsumi et al. ............ 395/140

FOREIGN PATENT DOCUMENTS
JP         A 04-267482        9/1992

OTHER PUBLICATIONS
Microsoft Organization Chart,1995, Version 2.00, pp. 1-14.*
MIcrosoft Org Chart, 1995, Version 2.0, pp. 1-23.*

* cited by examiner

Primary Examiner—Kimbinh T. Nguyen
(74) Attorney, Agent, or Firm—Staas & Halsey LLP

(57)    ABSTRACT

A flowchart containing objects A–C is displayed on a computer screen. Object B is subordinate to object A and object C is subordinate to object B. If a user selects object B, object B is deleted, and simultaneously objects A and C are connected. In this case, object C is subordinate to object A.

14 Claims, 38 Drawing Sheets

| ARRAY 1 | DISPLAY INFORMATION | POSITION INFORMATION | ADDITIONAL INFORMATION |
|---|---|---|---|
| 01 | A | 101 | |
| 02 | B | 102 | |
| 03 | C | 103 | |

← VALUE IN ARRAY 4

| ARRAY 2 | FRONT INFORMATION | REAR INFORMATION | ADDITIONAL INFORMATION |
|---|---|---|---|
| 11 | 01 | 02 | |
| 12 | 02 | 03 | |

↑ VALUE IN ARRAY 1

↑ VALUE IN ARRAY 1

| ARRAY 4 | NAME OF DATA | PRECEDING INFORMATION | X-COORDINATE | Y-COORDINATE | ADDITIONAL INFORMATION |
|---|---|---|---|---|---|
| 101 | a | — | 000 | 000 | |
| 102 | b | a | 001 | 000 | |
| 103 | c | b | 002 | 000 | |

F I G. 8A
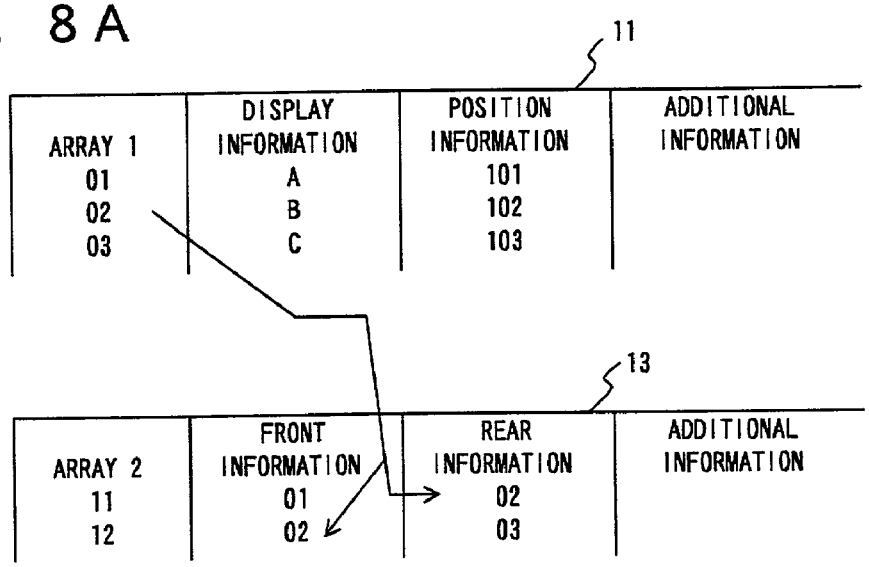
F I G. 8B
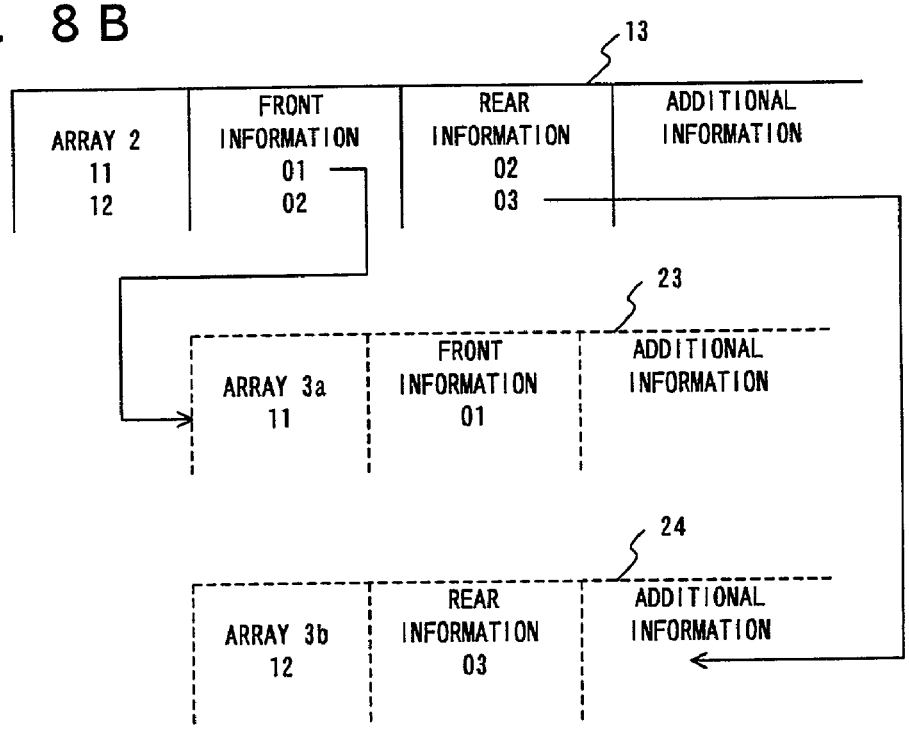

| ARRAY 1 | DISPLAY INFORMATION | POSITION INFORMATION | ADDITIONAL INFORMATION |
|---|---|---|---|
| 01 | A | 101 | |
| 02 | B | 102 | |
| 03 | C | 103 | |

THESE RECORDS ARE DELETED.

13

| ARRAY 4 | NAME OF DATA | PRECEDING INFORMATION | X-COORDINATE | Y-COORDINATE | ADDITIONAL INFORMATION |
|---|---|---|---|---|---|
| 101 | a | — | 000 | 000 | |
| 102 | b | a | 001 | 000 | |
| 103 | c | a | 001 | 000 | |

| ARRAY 2a | FRONT INFORMATION | REAR INFORMATION | ADDITIONAL INFORMATION |
|---|---|---|---|
| 11 | 01 | 03 | |

23

| ARRAY 2a | FRONT INFORMATION | ADDITIONAL INFORMATION |
|---|---|---|
| 11 | 01 | |

THESE RECORDS ARE DELETED.

24

| ARRAY 3b | REAR INFORMATION | ADDITIONAL INFORMATION |
|---|---|---|
| 12 | 03 | |

21

| ARRAY 0 | ADDITIONAL INFORMATION |
|---|---|
| 02 | |

FIG. 11A

| ARRAY 1 | DISPLAY INFORMATION | POSITION INFORMATION | ADDITIONAL INFORMATION |
|---|---|---|---|
| 01 | A | 101 | |
| 03 | C | 103 | |

FIG. 11B

| ARRAY 2 | FRONT INFORMATION | REAR INFORMATION | ADDITIONAL INFORMATION |
|---|---|---|---|
| 11 | 01 | 03 | |

FIG. 11C

| ARRAY 4 | NAME OF DATA | PRECEDING INFORMATION | X-COORDINATE | Y-COORDINATE | ADDITIONAL INFORMATION |
|---|---|---|---|---|---|
| 101 | a | — | 000 | 000 | |
| 103 | c | a | 001 | 000 | |

| ARRAY 1 | DISPLAY INFORMATION | POSITION INFORMATION | ADDITIONAL INFORMATION |
|---|---|---|---|
| 01 | A | 101 | |
| 02 | B | 102 | |
| 03 | C | 103 | |
| 04 | D | 104 | |
| 05 | E | 105 | |
| 06 | F | 106 | |

| ARRAY 2 | FRONT INFORMATION | REAR INFORMATION | ADDITIONAL INFORMATION |
|---|---|---|---|
| 11 | 01 | 03 | |
| 12 | 02 | 03 | |
| 13 | 03 | 04 | |
| 14 | 03 | 05 | |
| 15 | 03 | 06 | |

| ARRAY 4 | NAME OF DATA | PRECEDING INFORMATION | X-COORDINATE | Y-COORDINATE | ADDITIONAL INFORMATION |
|---|---|---|---|---|---|
| 101 | a | — | 000 | 000 | |
| 102 | b | — | 000 | 001 | |
| 103 | c | a, b | 001 | 001 | |
| 104 | d | c | 002 | 001 | |
| 105 | e | c | 002 | 002 | |
| 106 | f | c | 002 | 003 | |

| ARRAY 0 | ADDITIONAL INFORMATION |
|---|---|
| 03 | |

11

| ARRAY 1 | DISPLAY INFORMATION | POSITION INFORMATION | ADDITIONAL INFORMATION |
|---|---|---|---|
| 01 | A | 101 | |
| 02 | B | 102 | |
| 03 | C | 103 | |
| 04 | D | 104 | |
| 05 | E | 105 | |
| 06 | F | 106 | |

13

| ARRAY 4 | NAME OF DATA | PRECEDING INFORMATION | X-COORDINATE | Y-COORDINATE | ADDITIONAL INFORMATION |
|---|---|---|---|---|---|
| 11 | a | | 000 | 000 | |
| 12 | b | | 000 | 001 | |
| 13 | c | a, b | 001 | 001 | |
| 14 | d | c | 002 | 001 | |
| 15 | e | c | 002 | 002 | |
| 16 | f | c | 002 | 003 | |

| ARRAY 4 | NAME OF DATA | PRECEDING INFORMATION | X-COORDINATE | Y-COORDINATE | ADDITIONAL INFORMATION |
|---|---|---|---|---|---|
| 101 | a | — | 000 | 000 | |
| 102 | b | — | 000 | 001 | |
| 103 | c | a, b | 001 | 001 | |
| 104 | d | c → a, b | 002 → 001 | 001 | |
| 105 | e | c → a, b | 002 → 001 | 002 | |
| 106 | f | c → a, b | 002 → 001 | 003 | |

F I G. 15A

| ARRAY 1 | DISPLAY INFORMATION | POSITION INFORMATION | ADDITIONAL INFORMATION |
|---|---|---|---|
| 01 | A | 101 | |
| 02 | B | 102 | |
| 03 | C | 103 | |
| 04 | D | 104 | |
| 05 | E | 105 | |
| 06 | F | 106 | |

| ARRAY 2 | FRONT INFORMATION | REAR INFORMATION | ADDITIONAL INFORMATION |
|---|---|---|---|
| 11 | 01 | 03 | |
| 12 | 02 | 03 | |
| 13 | 03 | 04 | |
| 14 | 03 | 05 | |
| 15 | 03 | 06 | |

F I G. 15B

| ARRAY 2 | FRONT INFORMATION | REAR INFORMATION | ADDITIONAL INFORMATION |
|---|---|---|---|
| 11 | 01 | 03 | |
| 12 | 02 | 03 | |
| 13 | 03 | 04 | |
| 14 | 03 | 05 | |
| 15 | 03 | 06 | |

| ARRAY 3a | FRONT INFORMATION | ADDITIONAL INFORMATION |
|---|---|---|
| 11 | 01 | |
| 12 | 02 | |

| ARRAY 3b | REAR INFORMATION | ADDITIONAL INFORMATION |
|---|---|---|
| 13 | 04 | |
| 14 | 05 | |
| 15 | 06 | |

| ARRAY 1 | DISPLAY INFORMATION | POSITION INFORMATION | ADDITIONAL INFORMATION |
|---|---|---|---|
| 01 | A | 101 | |
| 02 | B | 102 | |
| 03 | C | 103 | |
| 04 | D | 104 | |
| 05 | E | 105 | |
| 06 | F | 106 | |

THESE RECORDS ARE DELETED.

| ARRAY 4 | NAME OF DATA | PRECEDING INFORMATION | X-COORDINATE | Y-COORDINATE | ADDITIONAL INFORMATION |
|---|---|---|---|---|---|
| 101 | a | — | 000 | 000 | |
| 102 | b | — | 000 | 001 | |
| 103 | c | a, b | 001 | 001 | |
| 104 | d | a, b | 001 | 001 | |
| 105 | e | a, b | 001 | 002 | |
| 106 | f | a, b | 001 | 003 | |

| ARRAY 1 | DISPLAY INFORMATION | POSITION INFORMATION | ADDITIONAL INFORMATION |
|---|---|---|---|
| 01 | A | 101 | |
| 02 | B | 102 | |
| 04 | D | 104 | |
| 05 | E | 105 | |
| 06 | F | 106 | |

FIG. 18B

| ARRAY 2 | FRONT INFORMATION | REAR INFORMATION | ADDITIONAL INFORMATION |
|---|---|---|---|
| 11 | 01 | 04 | |
| 12 | 01 | 05 | |
| 13 | 01 | 06 | |
| 14 | 02 | 04 | |
| 15 | 02 | 05 | |
| 16 | 02 | 06 | |

FIG. 18C

| ARRAY 4 | NAME OF DATA | PRECEDING INFORMATION | X-COORDINATE | Y-COORDINATE | ADDITIONAL INFORMATION |
|---|---|---|---|---|---|
| 101 | a | — | 000 | 000 | |
| 102 | b | — | 000 | 001 | |
| 104 | d | a, b | 001 | 001 | |
| 105 | e | a, b | 001 | 002 | |
| 106 | f | a, b | 001 | 003 | |

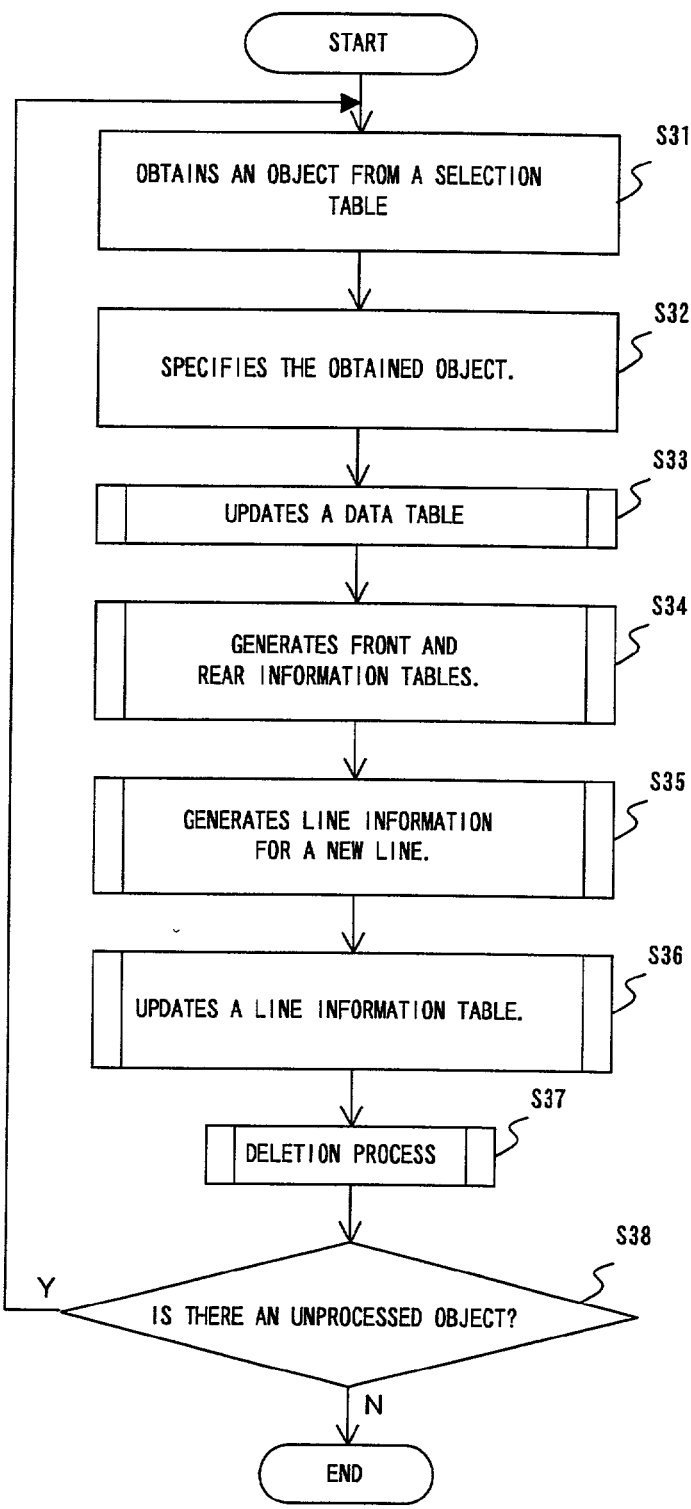
F I G. 2 2

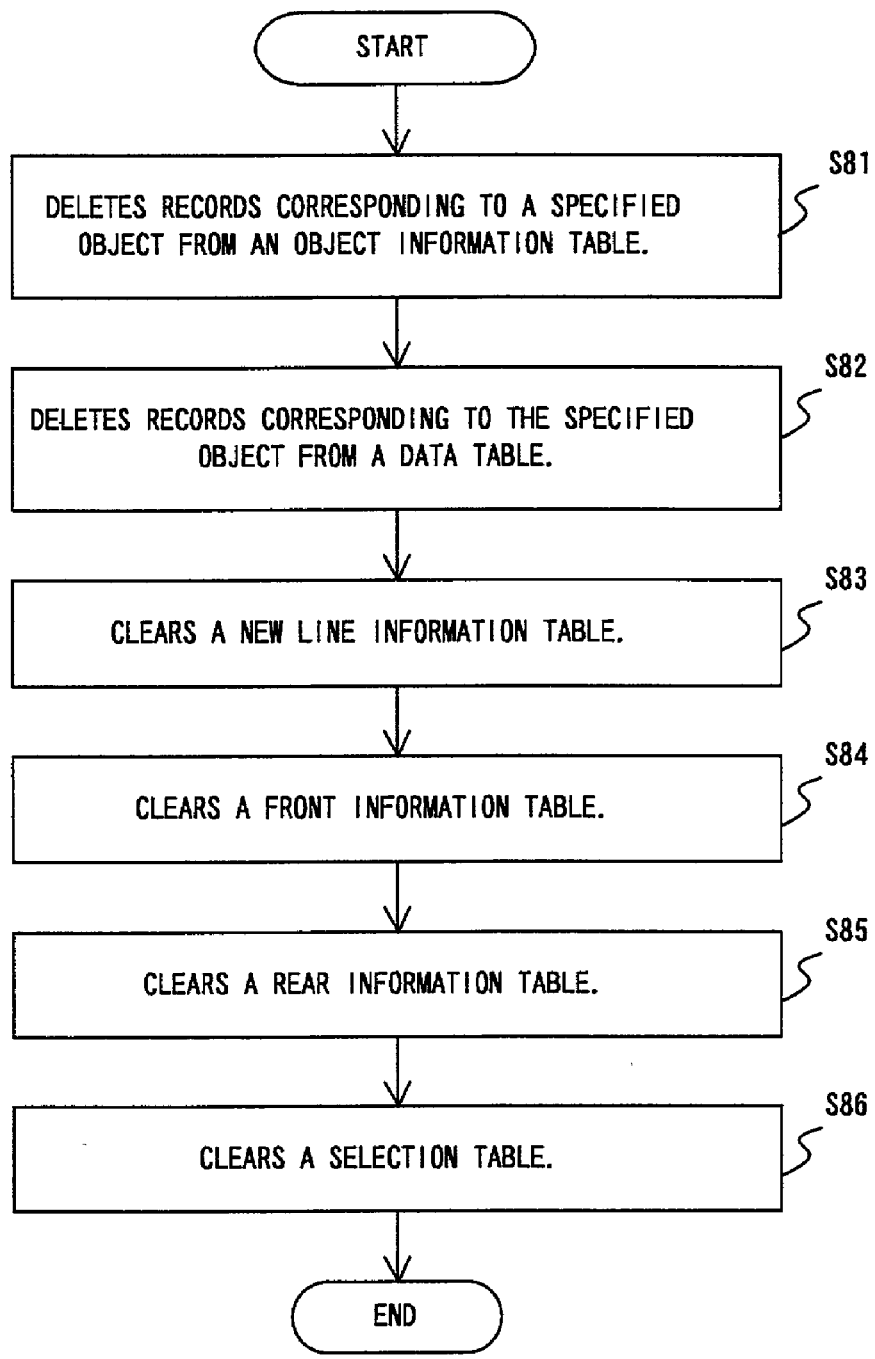
F I G. 2 7

F I G. 3 2 A
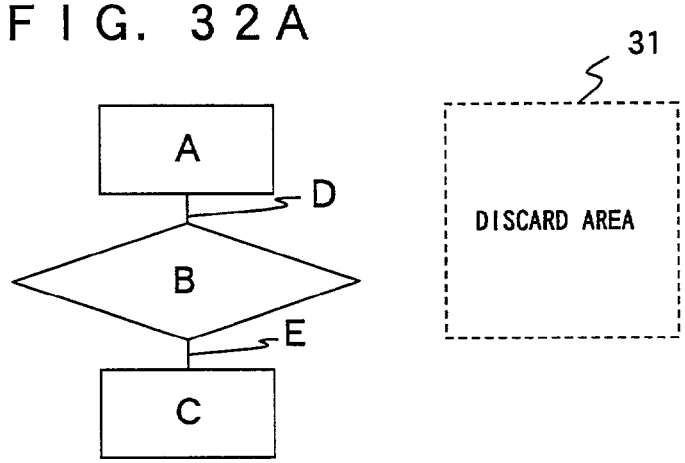
F I G. 3 2 B
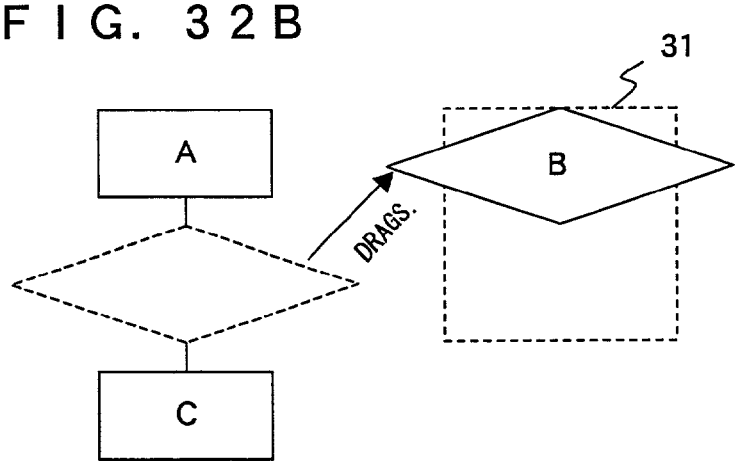
F I G. 3 2 C
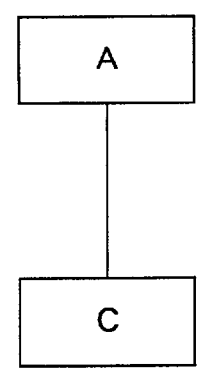

FIG. 35A

| INDEX | NAME OF OBJECT | COORDINATES | SHAPE | HEIGHT | WIDTH | |
|---|---|---|---|---|---|---|
| 1 | A | (Ax, Ay) | RECTANGLE | AH | AW | |
| 2 | B | (Bx, By) | DIAMOND | BH | BW | |
| 3 | C | (Cx, Cy) | RECTANGLE | CH | CW | |

FIG. 35B

| INDEX | NAME OF LINE | FRONT INFORMATION | START POINT COORDINATES | REAR INFORMATION | END POINT COORDINATES | HEIGHT |
|---|---|---|---|---|---|---|
| 1 | D | A | (Dsx, Dsy) | B→C | (Dex, Dey) | DH |
| 2 | E | B | (Esx, Esy) | C | (Eex, Eey) | EH |

GRAPHIC EDITING DEVICE, GRAPHIC EDITING METHOD AND STORAGE MEDIUM FOR STORING A PROGRAM

BACKGROUND OF THE INVENTION

1. Field of the Invention

The present invention relates to a device for deleting an object from a graphic including a plurality of objects connected each other and a method thereof.

2. Description of the Related Art

Recently a variety of flowcharts have often been plotted using a computer. As software with a function to plot graphics, etc., for example, "Power Point (Microsoft)", "Visio (Visio)", etc., are known.

For example, a flowchart is used to show the sequence of a workprocess or the sequence of the process of a software program, and usually includes a plurality of objects and lines/connectors connecting the plurality of objects.

FIG. 1A shows examples of flowcharts displayed on the screen of a computer. In this example, a flowchart in which three objects (objects A–C) are connected in alphabetical order is shown.

Lines connecting the objects indicate the order or subordination relationship of the objects in the flowchart. For example, line AB (connector connecting objects A and B) starts from the upper right corner of the object A. In this case, it is indicated that object A is the preceding object of object B while object B is the succeeding object of object A.

When a flowchart is plotted, there is often a case where a part of objects among objects which are connected with one another should be deleted during the editing work. For example, it is assumed that object B located between objects A and C is deleted. In this case, for example, as shown in FIG. 1B, line AB connecting the objects A and B is erased. To erase line AB, for example, two objects which are connected to each end of line AB are designated or line AB to be erased is designated after an erase process is called from an graphics editing menu. Then, similarly, line BC connecting objects Band C is erased, as shown in FIG. 1C.

Then, as shown in FIG. 1D, object B is deleted. In this case, for example, a process of deleting an object is provided in a menu for editing a graphic. Then, after the position of the object C is shifted, as shown in FIG. 1E, objects A and C are connected, as shown in FIG. 1F. In this way, an arbitrary object can be deleted while a sequence or a connection order among objects in a flowchart is maintained.

As described above, a process of deleting a part of object among objects which are connected with one another, when a flowchart, etc., is plotted, is a prior art. However, if existing application software is used, the operation often takes a significant amount of time and is troublesome to a user. For example, in the examples shown in FIGS. 1A–1F, a user must (a) erase a line connected to an object to be deleted, (b) delete the target object, and (c) connect the remaining objects to one another.

This problem is remarkable, in particular in a graphic where objects are complicatedly connected with one another. If there are many lines to be erased or to be newly plotted, the labor and working time increase in proportion to the complexity. In addition, a probability that an error may occur in erasing and plotting lines also increases.

This problem is not limited to application software for plotting flowcharts and can also occur, for example, in software for plotting graphics or software for plotting circuit diagrams.

SUMMARY OF THE INVENTION

It is an object of the present invention to simplify an operation required when a part of object among a plurality of objects which are connected with one another is deleted.

The graphic editing device of the present invention comprises a display unit displaying a graphic including the first, second and third objects connected in series, and an editor deleting the second object and connecting the first and third objects when the second object is selected (or designated).

The graphic editing device of another feature of the present invention comprises the above display unit and an editor deleting the second object and connecting the first and third objects when the second object is moved to a predetermined area.

The display unit displays the first to third objects, for example, on the screen of a computer. The second object is selected on the screen, for example, by a user's operation.

As described above, when the second object is selected or when the second object is moved to the predetermined area, the editor deletes the second object and connects the first and third objects. Therefore, when a user deletes a part of object among a plurality of objects which are connected to one another, there is neither a need for a user to delete lines or connectors connecting the objects or to connect the remaining objects with one another after deleting a target object.

In the above configuration, a management unit for managing a sequence of objects can be provided. In this case, if the second object is subordinate to the first object and the third object is subordinate to the second object before the second object is deleted, it is managed in such a way that the third object is subordinate to the first object. By adopting this configuration, the sequence or connection order of the remaining objects can be maintained even if a part of object among a plurality of objects which are connected with one another is deleted.

BRIEF DESCRIPTIONS OF THE DRAWINGS

FIGS. 4A–4C show tables provided by the graphic editing software in the first embodiment.

FIGS. 8A and 8B show a process of updating a table (No. 2).

FIGS. 10A and 10B show a process of updating a table (No. 4).

FIGS. 11A–11C show examples of updated tables.

FIGS. 13A–13C show examples of tables showing a graphic before the deletion of an object.

FIGS. 14A and 14B show processes of updating a table (No. 1).

FIGS. 15A and 15B show processes of updating a table (No. 2).

FIG. 17 shows a process of updating a table (No. 4).

FIGS. 18A–18C show examples of updated tables.

FIG. 22 is a flowchart showing a process of updating graphic data.

FIG. 27 is a flowchart showing a deletion process.

FIGS. 32A–32C show how to edit in the second embodiment (No. 1).

FIG. 35A shows an example of an object information table.

FIG. 35B shows an example of a line information table.

DESCRIPTION OF THE PREFERRED EMBODIMENTS

Figure 1A:
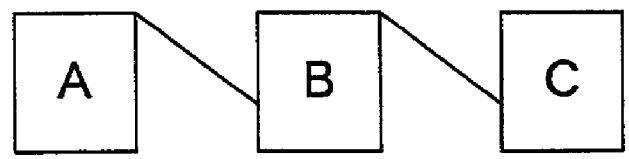
FIGS. 1A–1F show a method to delete a part of object among a plurality of objects which are connected to one another, using the existing method.
Figure 1B:
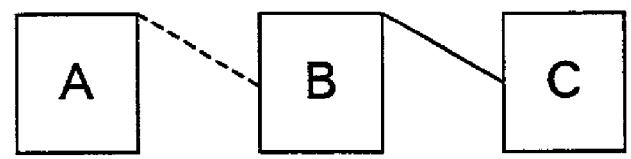
Figure 1C:
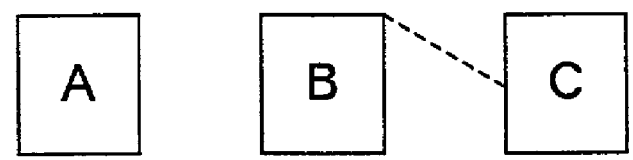
Figure 1D:
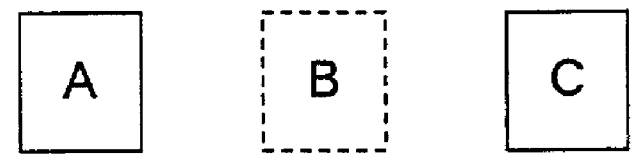
Figure 1E:
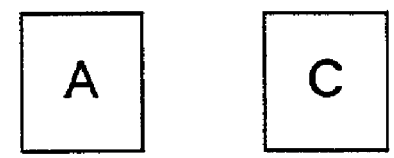
Figure 1F:
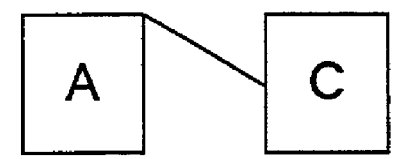
Figure 2:
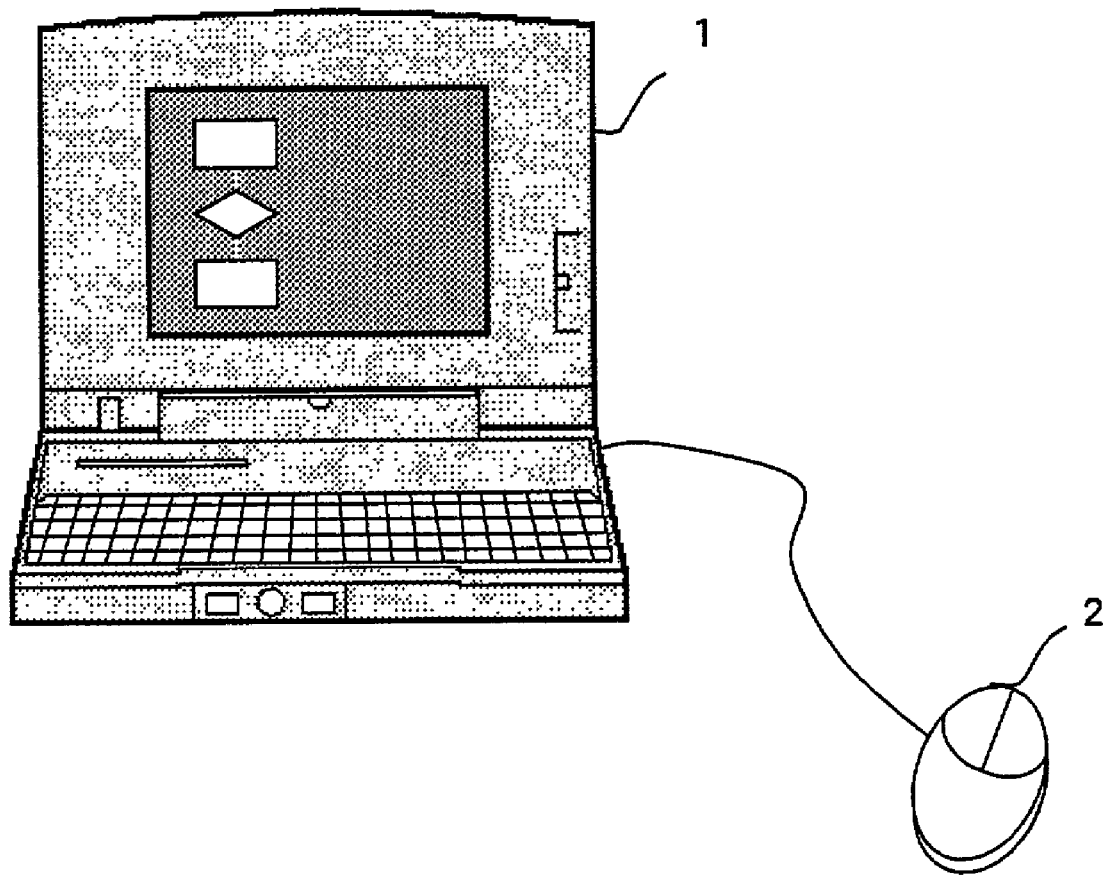
FIG. 2 shows an example of an environment where the present invention is put to a practical use.

A graphic editing method of the present invention relates to a method for editing graphics, etc., displayed on the screen of a computer 1 shown in FIG. 2. Although a graphic, etc., is basically edited by a user's operation using a mouse 2, it can also be edited by an instruction inputted using another input device. In the description of the following embodiments, a flowchart is edited as an example of a graphic, using the method of the present invention. In the flowchart, a graphic unit corresponding to each step of a flowchart is handled as one "object".

The First Embodiment

Figure 3A:
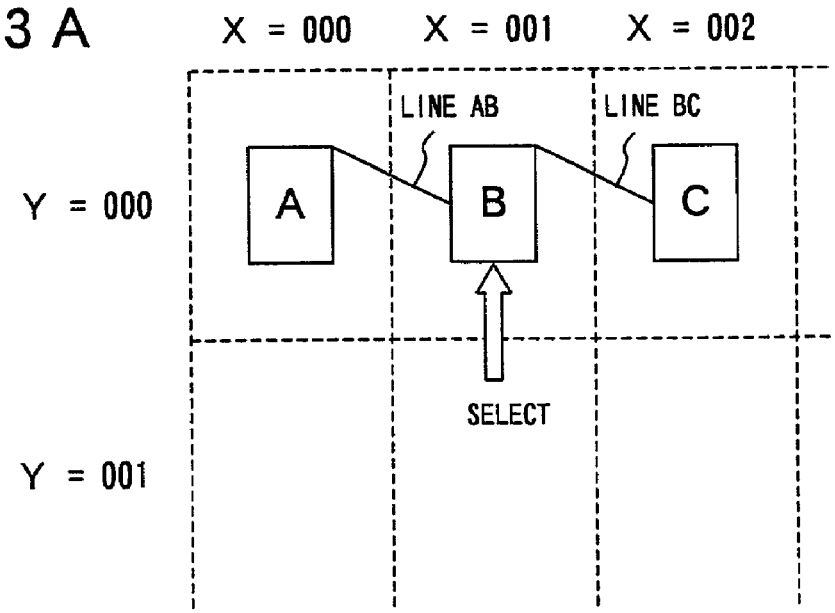
FIGS. 3A and 3B show how to edit a graphic in the first embodiment.
Figure 3B:
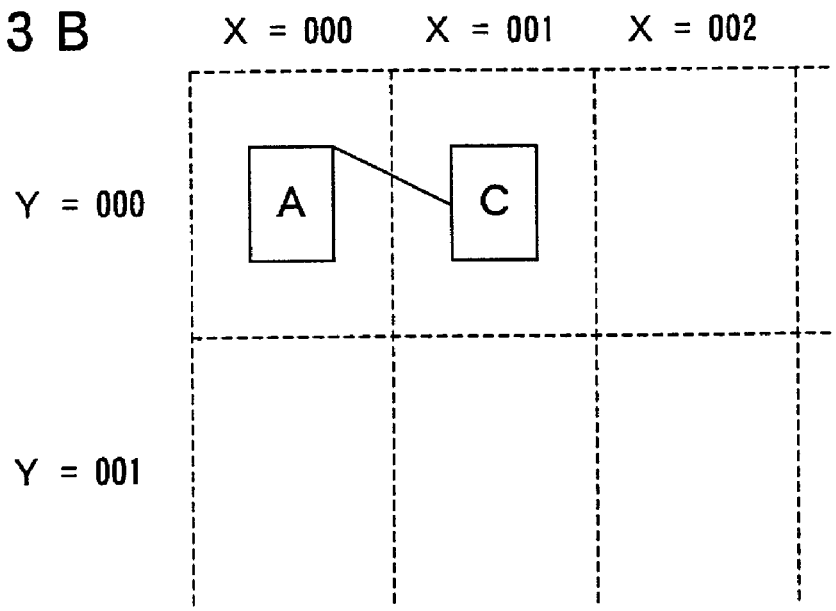

FIGS. 3A and 3B show how to edit a graphic in the first embodiment. Here, a case where object B located between objects A and C is deleted while a graphic (flowchart) in which objects A, B and C are connected in that order, is displayed. It is assumed that the graphic editing software of the first embodiment provides virtual coordinates system for displaying objects and that each object is displayed using the coordinate system.

When object B located between objects A and C is deleted in a state shown in FIG. 3A, a user first selects (or designates) object B. For example, a target object can be selected by directly clicking on the object using a mouse or by designating a range using a mouse. If objects are selected by designating a range, one or more objects existing within the designated range are to be selected.

Object B is connected to objects A and C by lines AB and BC, respectively. Here, since line AB starts from the upper right corner of object A, it is indicated that object A is the preceding object of object B and object B is the succeeding object of object A. Similarly, it is indicated that object B is the preceding object of object C and object C is the succeeding object of object B. A "line" is sometimes called a "connector".

Then, a user instructs an execution of a deletion process. This deletion process is executed, for example, using a function provided by graphic editing software. The graphic editing software usually has a function in a menu to delete a component, including an object, selected by a user.

If the deletion process is executed while object B is selected, as shown in FIG. 3B, object B is deleted from the graphic. In this case, a line connecting objects A and C is automatically generated. The display position of object C is automatically shifted leftward in such a way that the distance between objects A and C is appropriate.

In this way, according to the editing method of the first embodiment, a part of object among a plurality of objects which are sequentially connected is deleted only by selecting a target object and by inputting an instruction to delete the selected object. By this operation, the remaining objects are automatically connected while the connection order among the objects before the deletion is maintained, and each object is automatically relocated.

Next, the editing method of the first embodiment is described in detail. In this case it is assumed that objects A–C are displayed at coordinates, (X, Y)=(000, 000), (001, 000) and (002, 000), respectively, in a virtual coordinate system.

FIGS. 4A–4C show examples of tables provided by the graphic editing software of the first embodiment. Information stored in these tables indicates a display state of a graphic plotted by the graphic editing software of the first embodiment. In other words, a graphic plotted by the graphic editing software is displayed according to information stored in the tables.

FIG. 4A shows an example of an object information table 11. "Array 1" is an identification number for identifying a displayed object. "Display information" is information displayed on each object or the label name. "Position information" is key information to retrieve detail information for corresponding object from a data table 13 described later. If a new object is generated, a corresponding record is added to this table. If an object is deleted, a corresponding record is deleted from this table.

FIG. 4B shows an example of a line information table 12. "Array 2" is an identification number for identifying a line connecting displayed objects. "Front information" is information for designating objects located ahead of each line. "Rear information" is information for designating objects located behind each line. Both "front information" and "rear information" designate an object using a value in "array 1" of the object information table 11.

FIG. 4C shows an example of a data table 13. "Array 4" is an identifier to retrieve detail information for corresponding object registered in the object information table 11. "Data name" designates information for displaying corresponding object. "Preceding information" is information for indicating an object preceding each object. "X-coordinate" and "Y-coordinate" are the coordinates of a position where each object is displayed, and, in this example, the position is indicated using a virtual coordinate system.

The contents of the tables shown in FIGS. 4A–4C correspond to the display states of the graphic shown in FIG. 3A. That is to say, objects A, B and C are displayed according to the object information table 11 shown in FIG. 4A. Objects A, B and C are displayed at coordinates (X, Y)=(000, 000), (001, 000) and (002, 000), respectively, according to the data table 13 shown in FIG. 4C.

In the record of "array 2=11" of the line information table 12 shown in FIG. 4B, a line connecting an object registered in the record of "array 1=01" with an object registered in the record of "array 1=02", is registered. In this case, as shown in FIG. 4A, objects A and B are registered in records of the "array 1=01" and "array 1=02", respectively. Therefore, a line connecting objects A and B or line AB is plotted according to information registered in a record of "array 2=11". Similarly, a line connecting objects B and C or line BC is plotted according to information registered in a record of "array 2=12". The sequence (or connection order) among the objects is determined according to "front information" and "rear information" registered in the line information table.

Figure 5A:
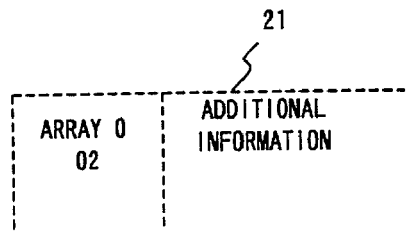
FIGS. 5A–5D show working tables temporarily used when a displayed graphic is edited.
Figure 5B:
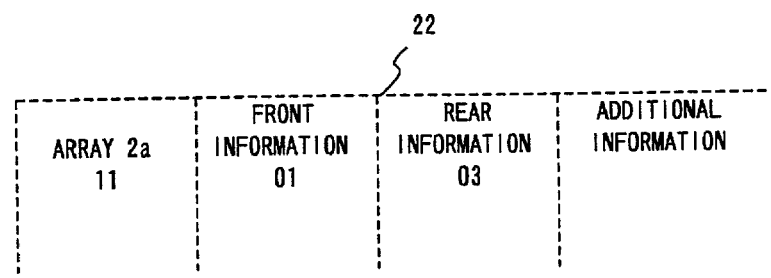
Figure 5C:
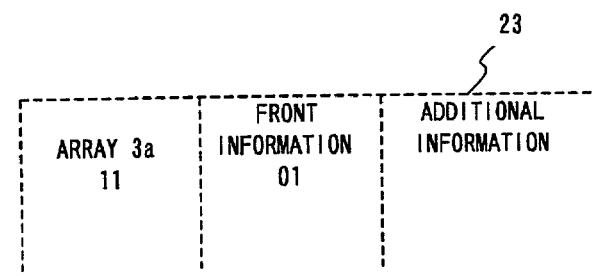
Figure 5D:
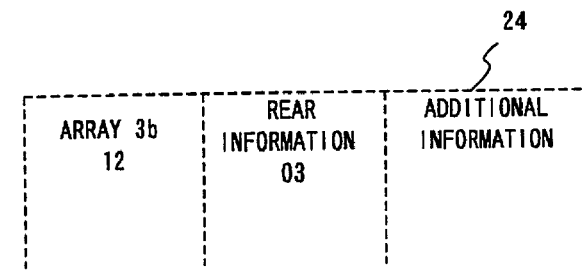

FIGS. 5A–5D show examples of working tables temporarily used when a displayed graphic is edited. FIG. 5A shows a selection table 21. "Array 0" identifies an object selected by a user. FIG. 5B shows a new line information table 22. "Array 2a" identifies a new line to be plotted. FIG. 5C shows a front information table 23. "Array 3a" identifies an object connected ahead of the object selected by the user. FIG. 5D shows a rear information table 24. "Array 3b" identifies an object connected behind the object selected by the user.

Figure 6:
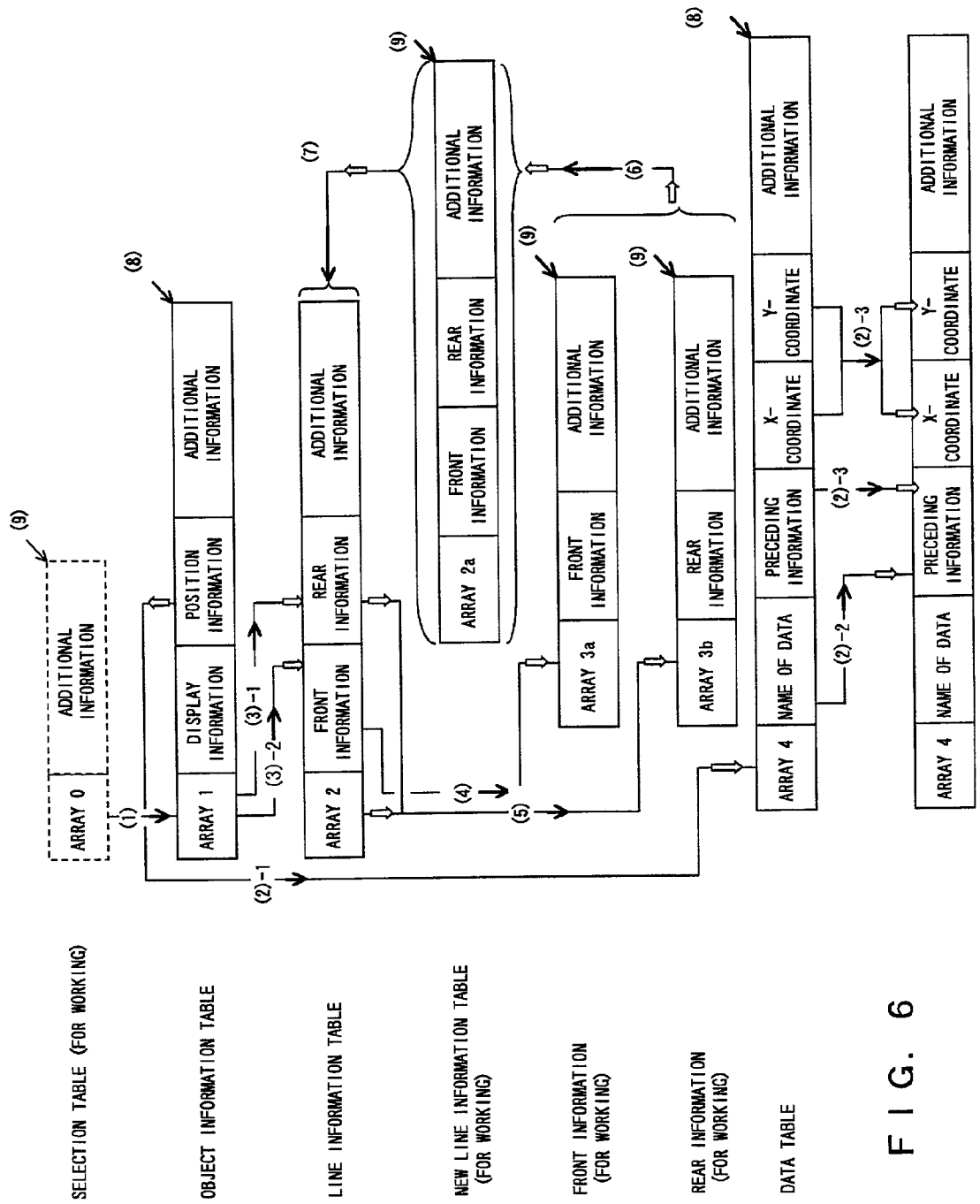
FIG. 6 shows the basic sequence of an object deletion process.

Next, the basic sequence when an object is deleted, is described with reference to FIG. 6. This sequence shows an operation after a user selects a target object. Parenthesized numeric characters in FIG. 6 correspond to process numbers used in the following description. For example, "(1)" shown in FIG. 6 corresponds to "process 1" in the following description.

Process 1: An object selected by a user (target object to be deleted) is specified. The selected object is registered in the selection table.

Process 2: A record in which the target object is registered as "preceding information" is extracted from a data table and the "preceding information" and "coordinates" of the record are updated. Here, process 2 includes processes 2-1 to 2-3.

Process 2-1: A record corresponding to the target object registered in the selection table is extracted from the data table. In this case, the data table is accessed using the value in "array 0" as a key.

Process 2—2: A record having "preceding information" matching the "data name" of the record extracted in process 2-1 is extracted.

Process 2-3: The "preceding information", "X-coordinate" and "Y-coordinate" of the record extracted in process 2-1 are written in the "preceding information", "X-coordinate" and "Y-coordinate", respectively, of the record extracted in process 2—2.

Process 3: Lines connected to the target object is specified. Process 3 includes processes 3-1 and 3-2.

Process 3-1: A line connecting the target object with an object preceding the target object is specified. In this case, the rear information field of the line information table is accessed using the value in "array 1" as a key.

Process 3-2: A line connecting the target object with an object succeeding the target object is specified. In this case, the front information field of the line information table is accessed using the value in "array 1" as a key.

Process 4: An object preceding the target object is registered in a front information table. In this case, the "front information" obtained in process 3-2 is registered in the front information table.

Process 5: An object succeeding the target object is registered in a rear information table. In this case, the "rear information" obtained in process 3-1 is registered in the rear information table.

Process 6: A new line to be plotted is registered in a new line information table. Specifically, a line connecting the object registered in the front information table with the object registered in the rear information table is registered in the new line information table. If a plurality of objects are registered in the front information table or rear information table, lines connecting the each of the objects are registered in the new line information table. Therefore, if n objects and m objects are registered in the front information table and rear information table, respectively, n×m lines are registered in the new line information table.

Process 7: The line registered in the new line information table is written in the line information table. Specifically, the information registered in the record accessed in process 3-1 or process 3-2 is replaced with the information registered in the new line information table.

Process 8: The record corresponding to the target object is deleted from the object information table and the data table.

Process 9: Working tables are initialized. Specifically, the new line information table, front information table and rear information table are initialized, and after all processes are completed, the selection table is initialized.

Then, after executing processes 1 to 9 described above, the graphic editing software plots a graphic according to the information registered in the object information table, line information table and data table. In this way, a graphic from which the object selected by the user is deleted, is displayed. In this case, a sequence of the objects to be displayed, which was defined before the target object was deleted by the user, is maintained.

Next, a specific example of a process of deleting an object using the graphic editing method of the first preferred embodiment is described.

THE FIRST EXAMPLE

In the first example, a process of obtaining the state shown in FIG. 3B by deleting object B in the state shown in FIG. 3A, is described. In this case, when the graphic shown in FIG. 3A is displayed, an object information table, a line information table and a data table are in the states shown in FIGS. 4A, 4B and 4C, respectively.

If object B should be deleted, a user selects object B and instructs the execution of a deletion process. Although a method for selecting a desired object is not limited to a specific one, the object, for example, can be selected by a mouse operation. The process order between selecting an object and instructing the execution of the deletion process is not limited to a specific one. For example, the graphic editing software of the first embodiment can be configured to select a target object after receiving a delete instruction.

When the user selects object B, the graphic editing software executes processes 1 to 9 described above with reference to FIG. 6.

Process 1: When a user selects object B, the graphic editing software registers object B in the selection table 21. Specifically, "02", which is a value for identifying object B in the object information table 11 is registered in the selection table 21. Therefore, when object B is selected, the selection table 21 shown in FIG. 5A is generated.

Process 2: The graphic editing software extracts a record for an object which is connected behind object B, and updates the "front information" and "coordinates" of the extracted record. In this case, the "front information" and "coordinates" of object B are written in the "front information" and "coordinates" of the extracted record. Specifically, process 2-1 to process 2-3 are executed.

Figures 7A, 7B:
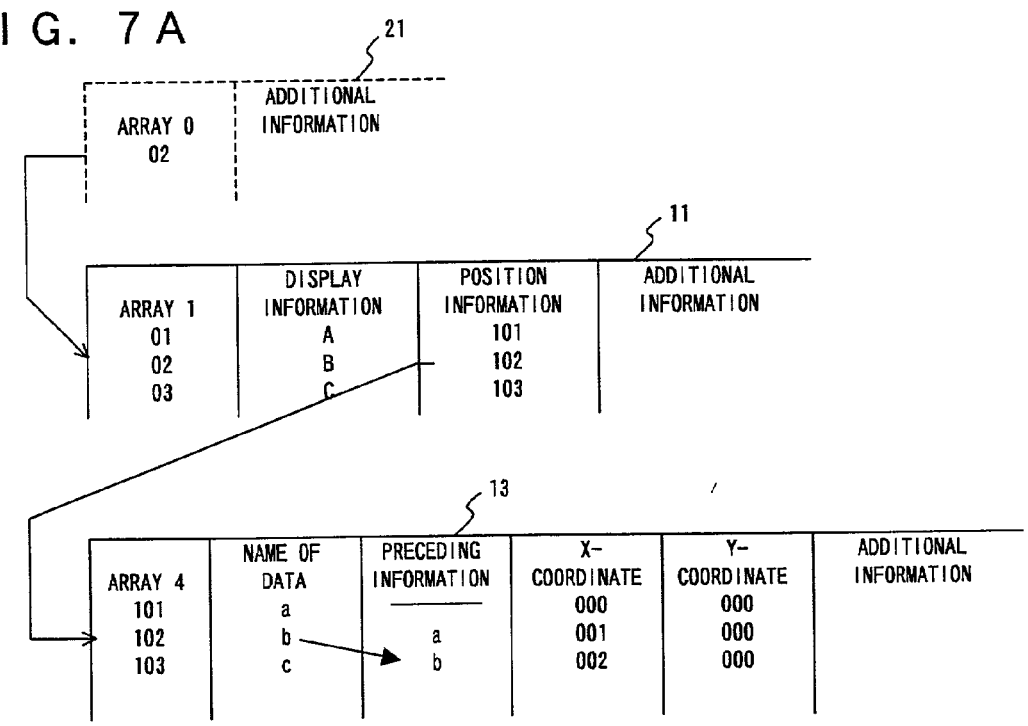
FIGS. 7A and 7B show a process of updating a table (No. 1).

Process 2-1: As shown in FIG. 7A, the graphic editing software accesses the object information table 11 using "array 0=02" registered in the selection table 21 as a key and extracts a corresponding record. Then, the software accesses the data table 13 using "position information=102" as a key and extracts a corresponding record.

Process 2—2: The graphic editing software retrieves data from the front information field of the data table 13, using the "data name=b" of the record extracted in process 2-1 as a key and extracts the record registering "preceding information=b".

Process 2-3: In the data table 13, as shown in FIG. 7B, the graphic editing software replaces the "preceding information" and "coordinates" of the record extracted in process 2—2 with "preceding information" and "coordinates", respectively, of the record extracted in process 2-1. Here, if the objects are horizontally connected, "X-coordinate" is updated. If the objects are vertically connected, "Y-coordinate" is updated. Therefore, as shown in FIG. 7B, in a record of "array 4=103", "preceding information" is updated from "b" to "a" and "X-coordinate" is updated from "002" to "001".

Process 3: The graphic editing software specifies lines connected to the object B. Specifically, the software extracts both of a record in which the object B is registered as "rear information" and a record in which the object B is registered as "front information" from the line information table 12. Specifically, the software executes process 3-1 and process 3-2.

Process 3-1: As shown in FIG. 8A, the graphic editing software searches a record from the rear information field of the data table 13 using "array 1=02" as a key, and extracts the record registering "rear information=02". In this way, a record specified by "array 2=11" is extracted.

Process 3-2: As shown in FIG. 8A, the graphic editing software searches a record from the front information field of the data table 13 using "array 1=02" as a key, and extracts the record registering "front information=02". In this way, a record specified by "array 2=12" is extracted.

Process 4: The graphic editing software registers an object which precedes object B in the front information table 23. Specifically, as shown in FIG. 8B, "front information=01" of the record extracted in process 3-2 is registered in the front information table 23.

Process 5: The graphic editing software registers an object which succeeds object B in the rear information table 24. Specifically, "rear information=03" of the record extracted in process 3-1 is registered in the rear information table 24.

Figure 9A:
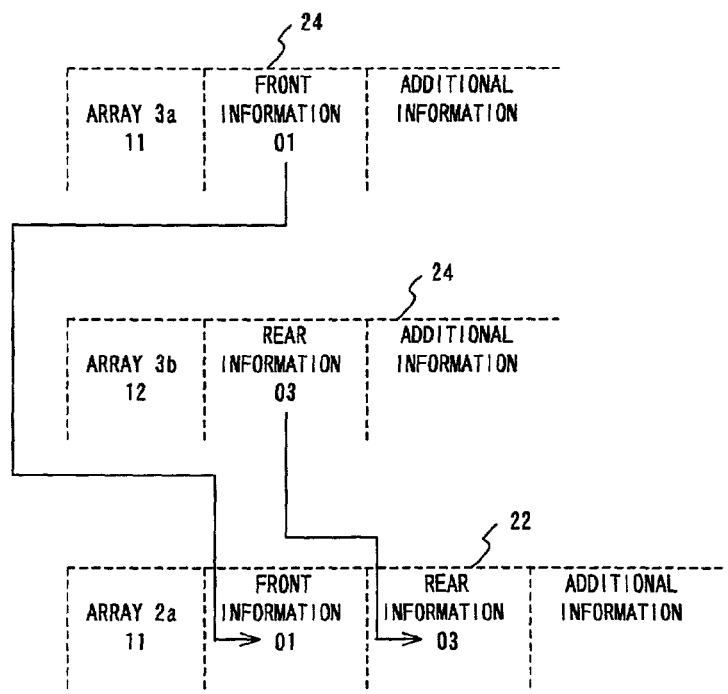
FIGS. 9A and 9B show a process of updating a table (No. 3).

Process 6: The graphic editing software registers a new line to be plotted in the new line information table. Specifically, the software registers objects which are connected to the new line to be plotted. Specifically, as shown in FIG. 9A, both "front information=01", registered in the front information table 23, and "rear information=03", registered in the rear information table 24, are registered in the new line information table 22.

Figure 9B:
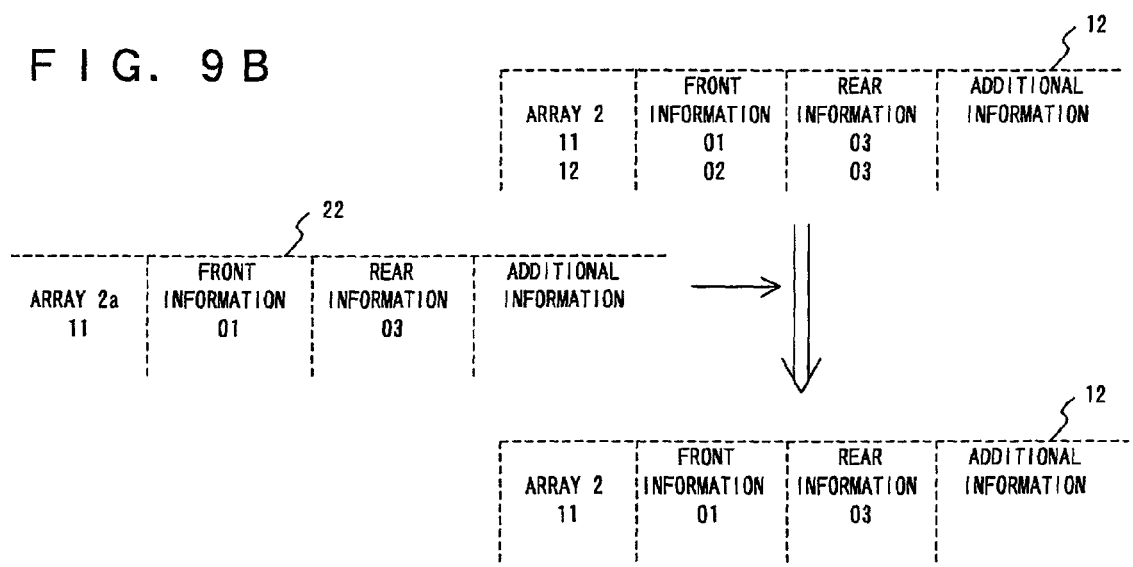

Process 7: The graphic editing software writes information registered in the new line information table 22 in the line information table 12. Specifically, as shown in FIG. 9B, in the line information table 12, information registered in each record accessed in process 3-1 or process 3-2 is replaced with information registered in the new line information table 22. In this way, a line connecting "front information=01 (object A)" with "rear information=03 (object C)" is registered in the line information table 12.

Process 8: As shown in FIG. 10A, the graphic editing software deletes records corresponding to the object B from the object information table 11 and data table 13.

Process 9: The graphic editing software initializes working tables used when object B is deleted. Specifically, as shown in FIG. 10B, the software deletes the respective records of the new line information table 22, front information table 23 and rear information table 24, and after all other processes are completed, the software further deletes information registered in the selection table 21.

FIGS. 11A–11C show examples of the object information table 11, line information table 12 and data table 13 that are updated in processes 1–9 described above. The graphic editing software plots a graphic according to information registered in these updated tables. Specifically, objects A and C are displayed at coordinates (X, Y=000, 000) and (X, Y=001, 000), respectively, according to the object information table 11 shown in FIG. 11A and data table 13 shown in FIG. 11C. A line connecting the objects A and C is plotted according to the line information table 12 shown in FIG. 11B. In this case, the sequence of objects A and C is registered in the line information table 12. Specifically, object A is the preceding object of object C, and object C is the succeeding object of object A. In this way, the graphic shown in FIG. 3B is obtained.

In the above example, a graphic is plotted according to a rule that a flow of objects is expressed using an X-coordinate. Therefore, when object B located between objects A and C is deleted, object C is horizontally shifted. However, the present invention is not limited to this configuration. For example, in a graphic which is plotted according to a rule that a flow of objects is expressed using a Y-coordinate, object C can be shifted vertically when object B located between objects A and C is deleted.

In this case, the shift direction of an object is determined, for example, by comparing the coordinate of an object selected by a user with the coordinate of an object next to the selected object. For example, if the Y-coordinate of an object selected by a user with the Y-coordinate of an object next to the selected are the same, the object is horizontally shifted. If the respective X-coordinates of the objects are the same, the object is vertically shifted.

THE SECOND EXAMPLE

Figure 12A:
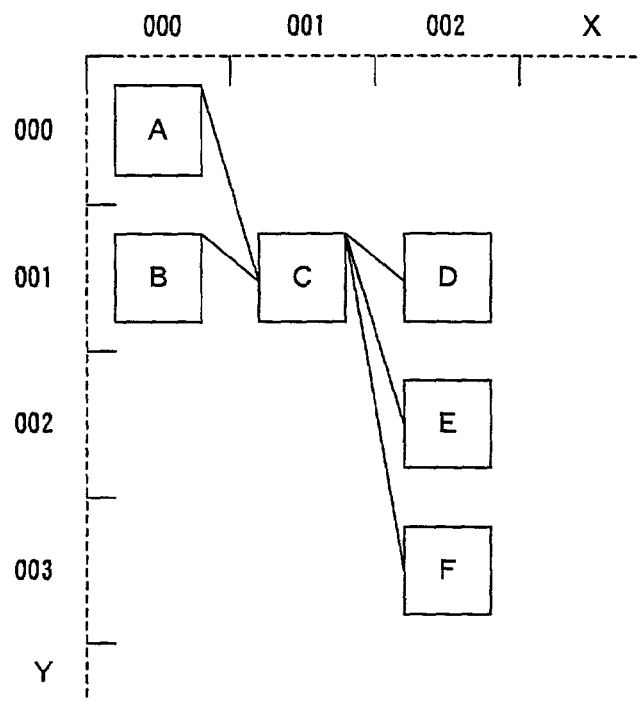
FIGS. 12A and 12B show examples of graphic editing in the second embodiment.
Figure 12B:
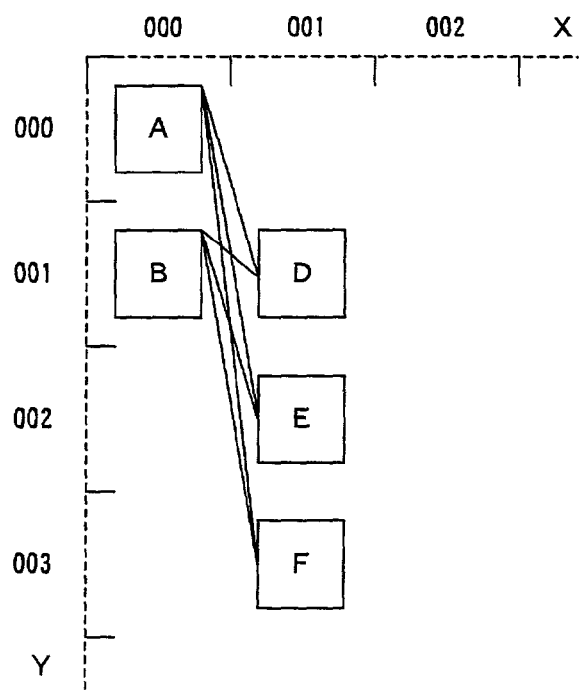

The second example shows a process of obtaining a graphic shown in FIG. 12B by deleting object C in a graphic shown in FIG. 12A. In this case, when the graphic shown in FIG. 12A is displayed, the object information table, line information table and data table are in the states shown in FIGS. 13A, 13B and 13C, respectively.

If a user selects object C, the graphic editing software executes processes 1–9 described above with reference to FIG. 6.

Process 1: When a user selects object C, the graphic editing software registers object C in the selection table 21. Specifically, "03", which is a value for identifying object C in the object information table 11, is registered in the selection table 21.

Process 2: The graphic editing software extracts records for objects connected below object C from the data table 13 and updates "front information" and "coordinates" of each record. In this case, the "front information" and "coordinates" of object C are written in "front information" and "coordinates" of each record, respectively. Specifically, processes 2-1 to 2-3 are executed.

Process 2-1: As shown in FIG. 14A, the graphic editing software accesses the object information table 11 using "array 0=03" registered in the selection table 21 as a key and extracts corresponding records. Then, the software accesses the data table 13 using the "position information=103" resistored in the extracted record as a key and extracts corresponding records.

Process 2—2: The graphic editing software retrieves data from the front information field of data table 13, using "data name=c" of the record extracted in process 2-1 and extracts records registering "preceding information=c". In this way, three records are extracted, as shown in FIG. 14A.

Process 2-3: In data table 13, the graphic editing software replaces "preceding information" and "coordinates" of each record extracted in process 2—2 with "preceding information" and "coordinates", respectively, of the record extracted in process 2-1. In this way, as shown in FIG. 14B, in the respective records of "array 4=104", "array 4=105" and "array 4=106", "preceding information" is updated from "c" to "a, b", and simultaneously "X-coordinate" is updated from "002" to "001".

Process 3: The graphic editing software specifies lines connected to object C. Specifically, the software extracts both records registering object C as "rear information" and records registering object C as "front information" from the line information table 12. Specifically, processes 3-1 and 3-2 are executed.

Process 3-1: As shown in FIG. 15A, the graphic editing software retrieves data from the rear information field of the data table 13 using "array 1=03" as a key and extracts records registering "rear information=03". In this way, a record specified by "array 2=11" and a record specified by "array 2=12" are extracted from the data table 13.

Process 3-2: As shown in FIG. 15A, the graphic editing software retrieves data from the front information field of the data table 13 using "array 1=03" as a key and extracts records registering "front information=03". In this way, a record specified by "array 2=13", a record specified by "array 2=14" and a record specified by "array 2=15" are extracted from the data table 13.

Process 4: The graphic editing software registers objects preceding object C in the front information table 23. Specifically, as shown in FIG. 15B, "front information=01" and "front information=02" registered in each record extracted in process 3-2 are registered in the front information table 23.

Process 5: The graphic editing software registers objects succeeding object C in the rear information table 24. Specifically, as shown in FIG. 15B, "rear information=04", "rear information=05" and "rear information=06" that are registered in each record extracted in process 3-1 are registered in the rear information table 24.

Figure 16A:
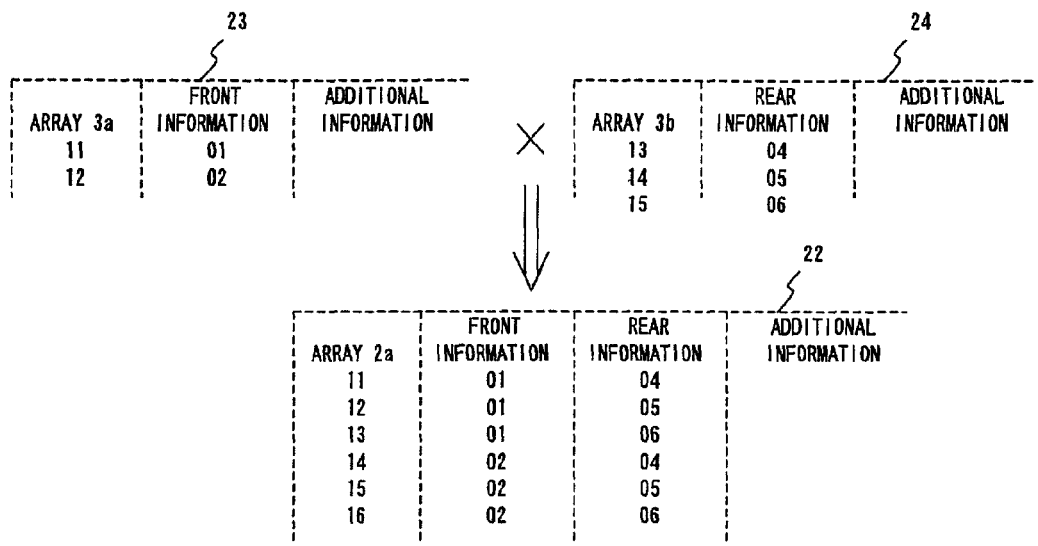
FIGS. 16A and 16B show processes of updating a table (No. 3).

Process 6: The graphic editing software registers new lines to be plotted in the new line information table. Specifically, as shown in FIG. 16A, lines obtained by combining objects registered in the front information table 23 and objects registered in the rear information table 24 are registered in the new line information table 22. In this example, since two objects and three objects are registered in the front information table 23 and rear information table 24, respectively, six lines are registered in the new line information table 22.

Figure 16B:
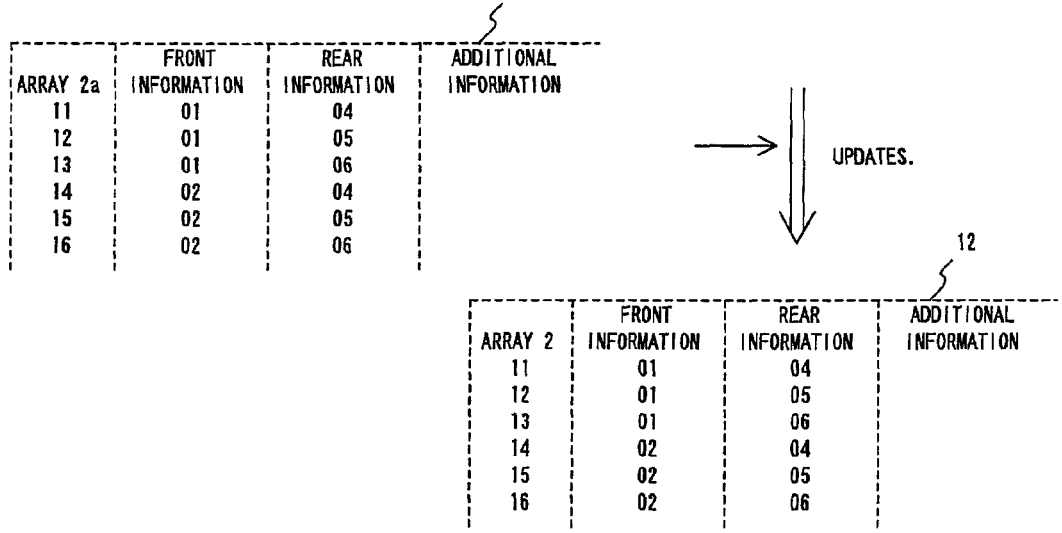
Figure 19:
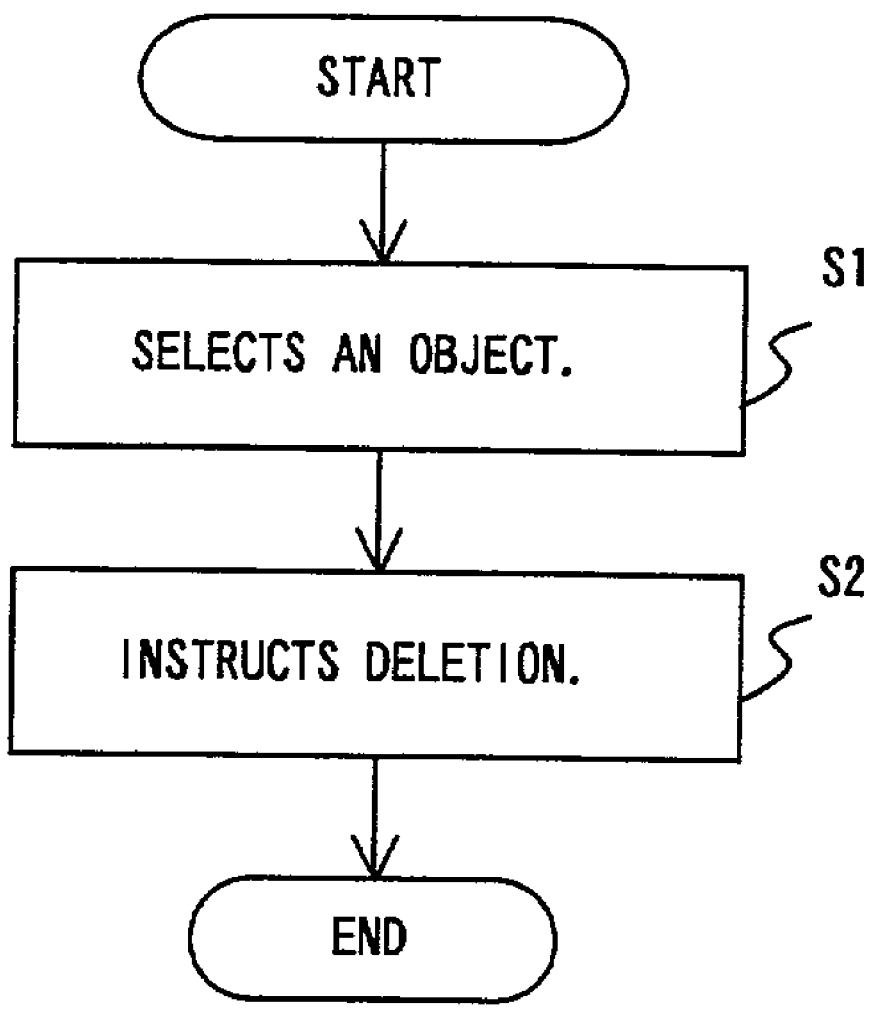
FIG. 19 is a flowchart showing a user's operation.

Process 7: The graphic editing software writes information registered in the new line information table 22, in the line information table 12. Specifically, as shown in FIG. 16B, in the line information table 12, information registered in the records accessed in processes 3-1 or 3-2 is replaced with information registered in the new line information table 22. In this way, six lines are registered in the line information table 12. Specifically, a line connecting "front information=01 (object A)" with "rear information=04 (object D)", a line connecting "front information=01 (object A)" with "rear information=05 (object E)", a line connecting "front information 01 (object A)" with "rear information=06 (object F)", a line connecting "forward=02 (object B)" and "rear information=04 (object D)", a line connecting "front information=02 (object B)" with "rear information=05 (object E)" and a line connecting "front information=02 (object B)" with "rear information=06 (object F)" are registered.

Process 8: As shown in FIG. 17, the graphic editing software deletes records corresponding to object C from both the object information table 11 and data table 13.

Process 9: The graphic editing software initializes working tables used to delete object C. Specifically, the respective records of the new line information table 22, front information table 23 and rear information table 24 are deleted, and after all other processes are completed, information registered in the selection table 21 is deleted.

FIGS. 18A–18C show respective examples of the object information table 11, line information table 12 and data table 13 that are updated in processes 1–9 described above. The graphic editing software plots a graphic according to information registered in the updated tables. Specifically, objects A, B, D, E and F registered in the object information table 11 shown in FIG. 18A are displayed in the positions registered in the data table 13 shown in FIG. 18C. Six lines are plotted according to the line information table 12 shown in FIG. 18B. In this way, the graphic shown in FIG. 12B is obtained.

Flowcharts Showing the Editing Method of the First Embodiment

FIG. 18 is a flowchart showing a user's operation. In step S1, a user selects an object. In step S2, the user inputs an instruction to delete the selected object. The method for selecting an object and the method for inputting the instruction are as described above. In addition, as described above, the operation order of selecting an object and instructing the execution of the deletion process can be reversed depending on the graphic editing software program.

In this way, when an object is deleted in a graphic, using the graphic editing software of this embodiment, there is no need for a user to delete lines connecting objects and to connect the remaining objects. Therefore, the operation is simple.

Figure 20:
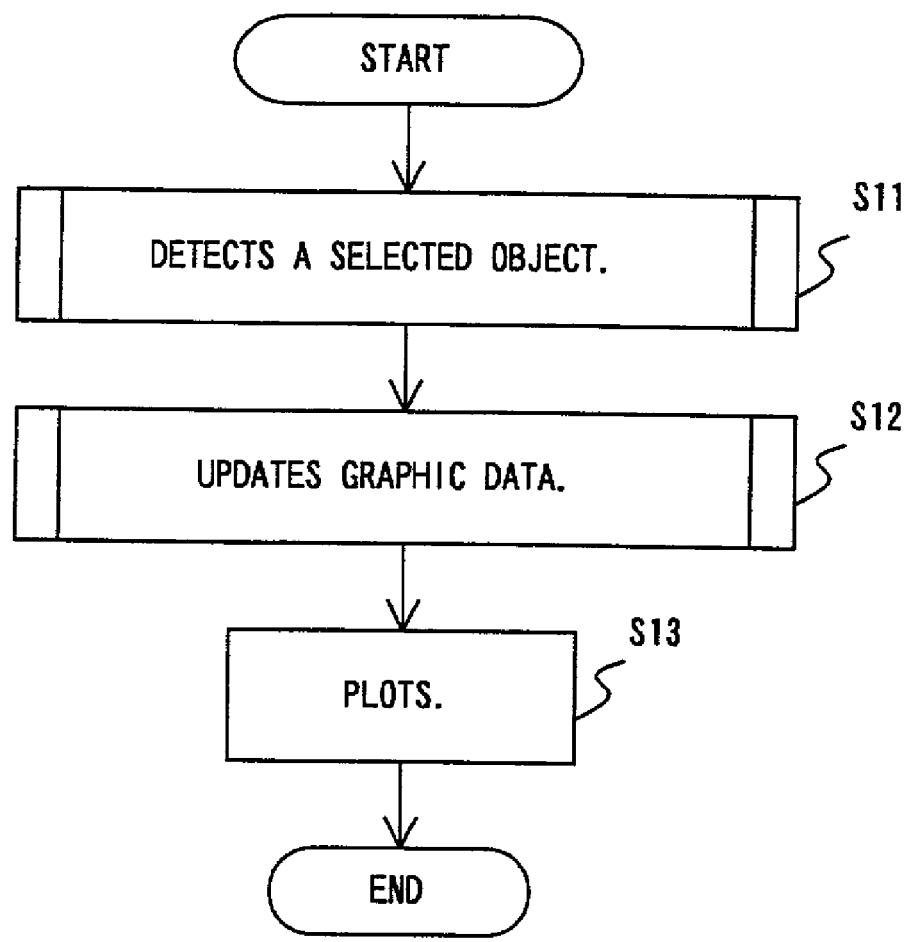
FIG. 20 is a basic flowchart showing the operation of the graphic editing software.

FIG. 20 is a basic flowchart showing the operation of the graphic editing software. The process shown by this flowchart is executed when a target object is selected by a user. In step S11, the graphic editing software detects the object selected by the user. In step S12, the software updates graphic data. Graphic data include at least information registered in the tables shown in FIGS. 4A–4C. In step S13, the software displays a graphic based on the data updated in step S12.

Figure 21:
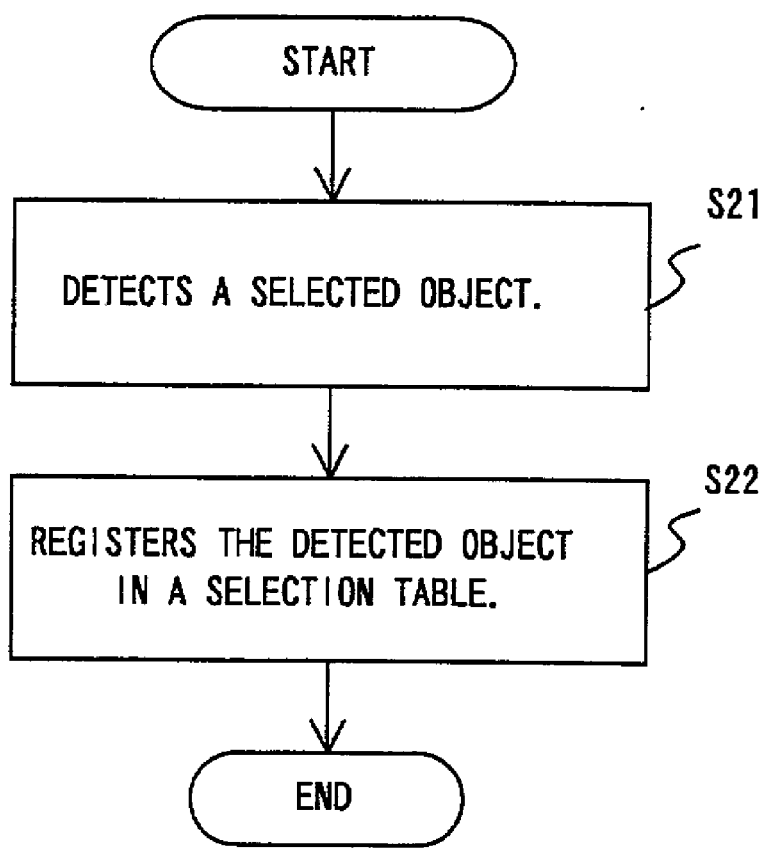
FIG. 21 is a flowchart showing a process of detecting a selected object.

FIG. 21 is a flowchart showing a process of detecting the selected object. The process corresponds to the process in step S11 shown in FIG. 20. In step S21, the software detects the object selected by the user. In step S22, the software registers the object detected in step S21 in the selection table. In this way, one or more objects selected by the user are registered in the selection table.

FIG. 22 is a flowchart showing a process of updating graphic data. The process corresponds to the process in step S12 shown in FIG. 20. This process is executed for each object registered in the selection table. That is to say, this process is executed for each object selected by the user.

In step S31, one of the objects registered in the selection table is obtained. In step S32, the object obtained in step S31 is specified by referring to the object information table. Then, steps S33–S37 are executed for the specified object.

In step S33, a data table is updated. This process corresponds to process 2 described with reference to FIG. 6. In step S34, a front information table and a rear information table are generated. This process corresponds to processes 3–5 described above. In step S35, line information for a new line is generated. This process corresponds to process 6 described above. In step S36, a line information table is updated. This process corresponds to process 7 described above. In step s37, a deletion process is executed. This process corresponds to processes 7 and 9 described above. Step S38 is a process of executing steps S32–S37 for all the objects registered in the selection table.

Figure 23:
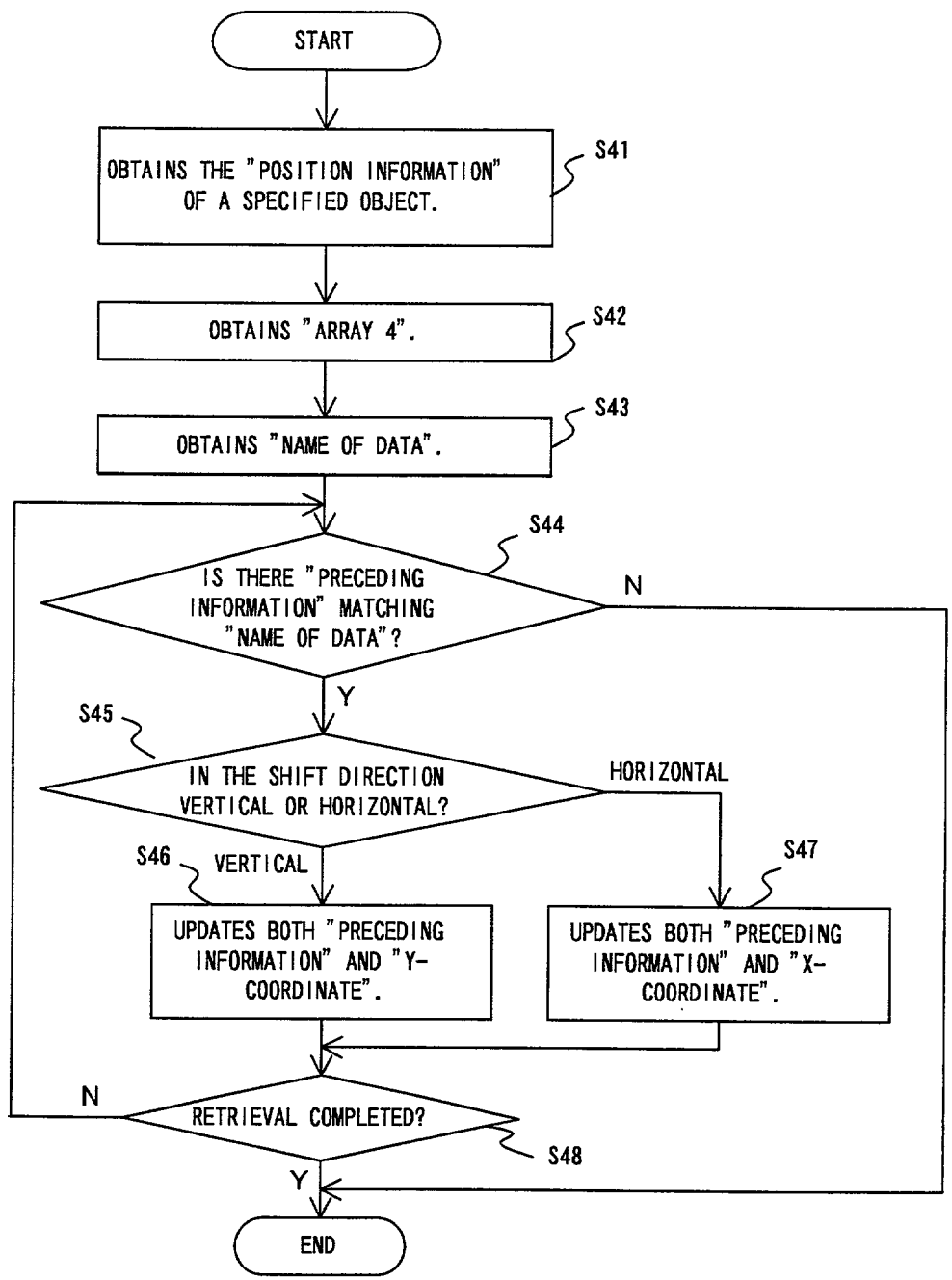
FIG. 23 is a flowchart showing a process of updating a data table.

FIG. 23 is a flowchart showing a process of updating a data table. This process corresponds to the process in step S33 shown in FIG. 22. In step S41, "position information" corresponding to a specified object is obtained from an object information table. In step S42, "array 4" corresponding to the "position information" obtained in step S41 is obtained from the data table. In step S43, "data name" corresponding to "array 4" obtained in step S42 is obtained.

In step S44, the preceding information field of the data table is searched and a record recording "preceding information" that matches the "data name" obtained in step S43 is extracted. If such a record is obtained, the flow proceeds to step S45. If it is not obtained, the process is terminated.

In step S45, it is checked whether the shift direction of the object is vertical or horizontal. For example, in the example shown in FIG. 3 or 12, the shift direction of the object is horizontal. If the shift direction of the object is vertical, in step S46, the "preceding information" and "Y-coordinate" of each record extracted in step S44 are updated. If the shift direction of the object is horizontal, in step S47, the "preceding information" and "X-coordinate" of each record obtained in step S44 are updated. In steps 46 or 47, "preceding information" and "coordinate" are replaced with "preceding information" and "coordinate" of the record specified by "array 4" obtained in step 42. Step S48 is a process of executing steps S44–S47 for all elements registered in the front information field.

In this way, information for designating the display position of objects connected behind the object selected by a user is updated. In this case, the connection order or connection relationship among objects in the graphic does not change between before and after the object selected by the user is deleted.

Figure 24:
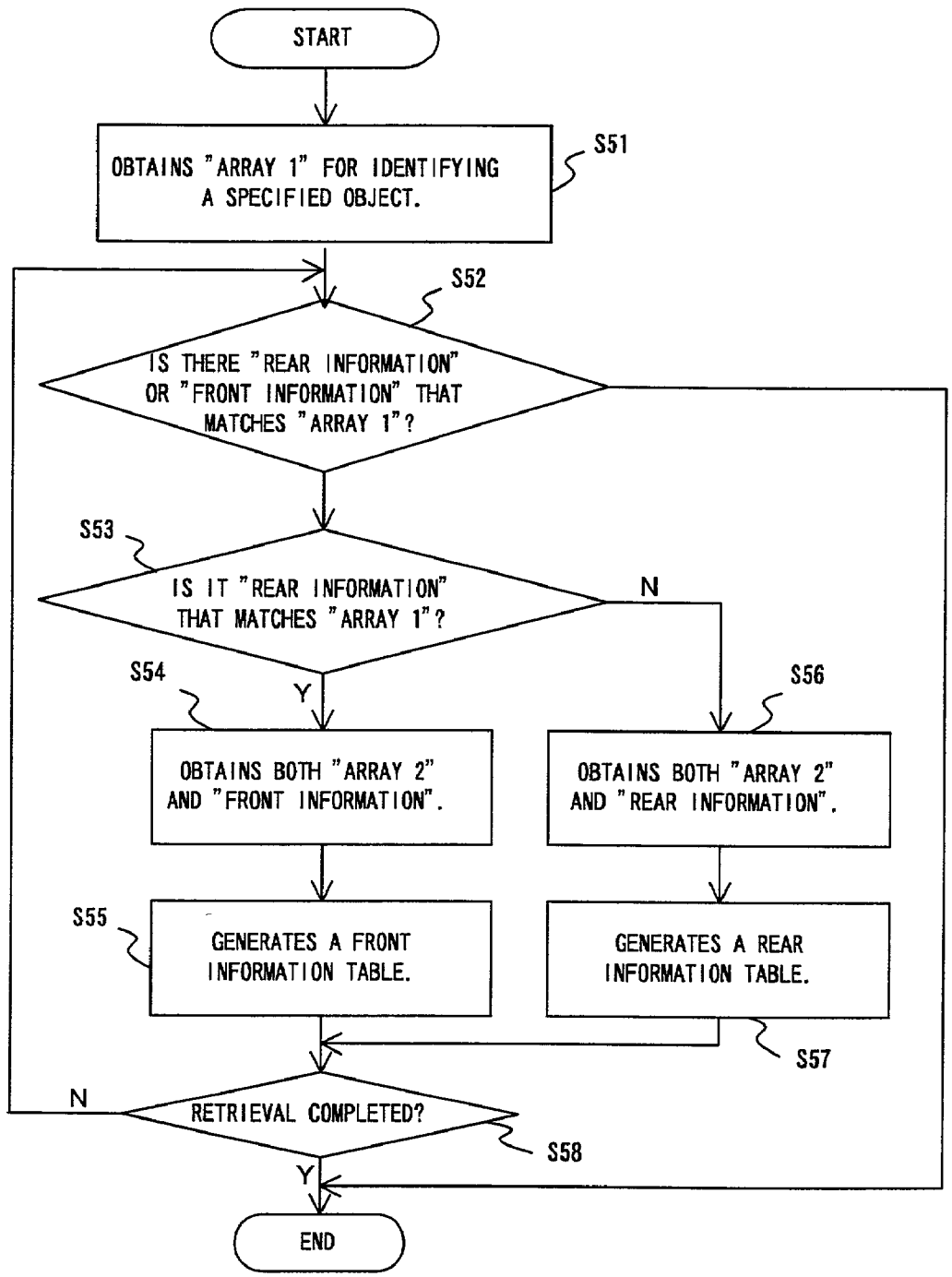
FIG. 24 is a flowchart showing a process of generating both a front information table and a rear information table.

FIG. 24 is a flowchart showing a process of generating a front information table and a rear information table. This process corresponds to the process in step S34 shown in FIG. 22. In step S51, "array 1" for identifying an object specified in an object information table is obtained. In step S52, it is checked whether in a line information table there is "front information" or "rear information" that matches "array 1" obtained in step S51. If there is "front information" or "rear information" matching "array 1", in step S53, it is judged which matches "array 1", "front information" or "rear information".

If "array 1" matches "rear information", in step S54, "array 2" and "front information" are obtained from records registering the "rear information". Then, in step S55, the "array 2" and "front information" are registered in a front information table. If "array 1" does not match "rear information", in step S56, "array 2" and "rear information" are obtained from records registering "front information" that matches "array 1". Then, in step S57, the "array 2" and "rear information" are registered in a rear information table. Step S58 is a process of executing steps S52–S57 for all lines connected to the specified object.

In this way, objects connected to the object selected by a user are listed. In this case, objects located a head of the selected object and objects located behind the selected object are classified into different groups.

Figure 25:
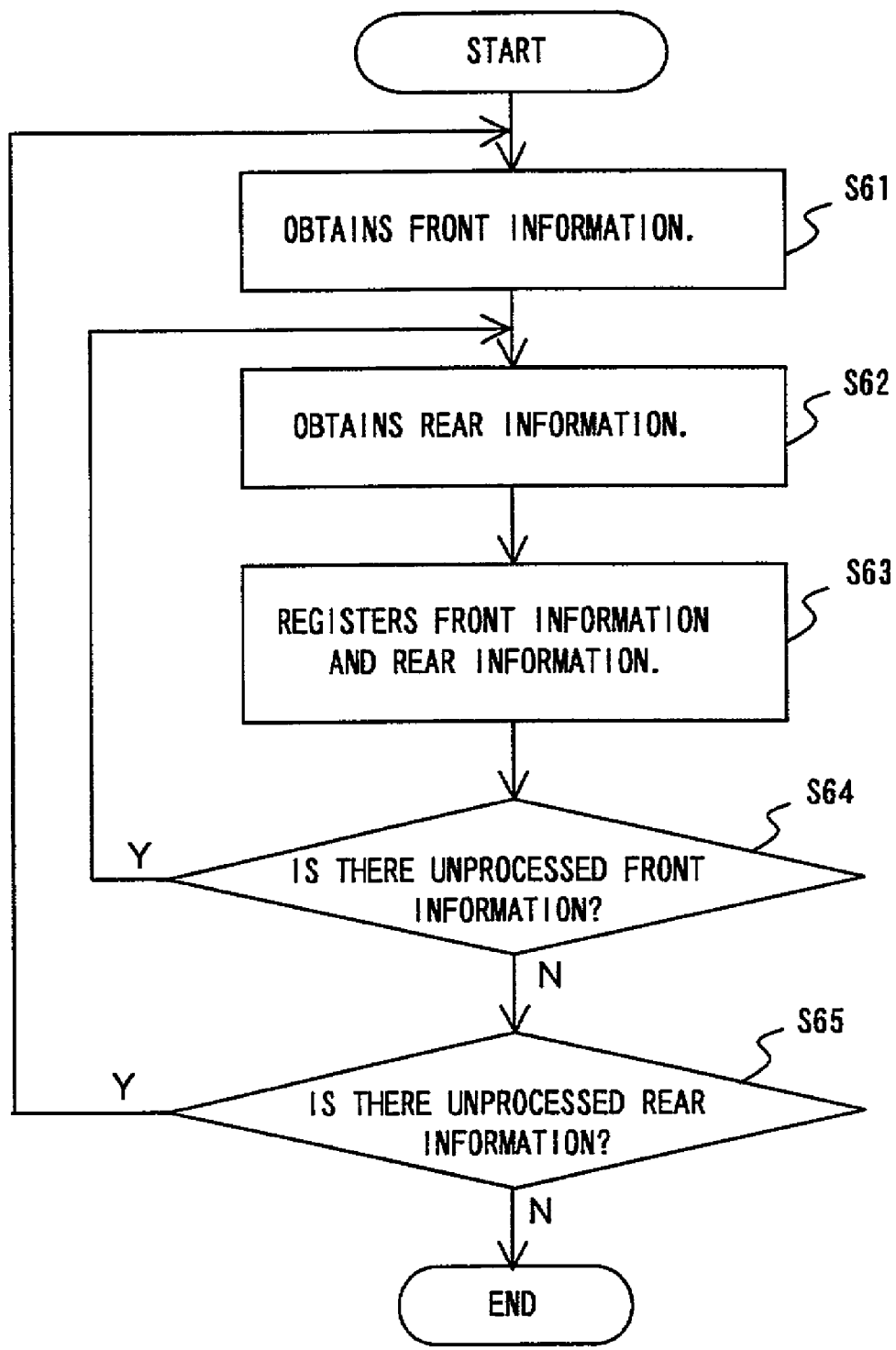
FIG. 25 is a flowchart showing a process of generating information about a new line.

FIG. 25 is a flowchart showing a process of generating information for new lines. This process corresponds to the process in step S35 shown in FIG. 22. In step S61, one set of "front information" is obtained from the top of a front information table. In step S62, one set of "rear information" is obtained from the top of a rear information table. In step S63, the obtained "front information" and "rear information" are registered in a new line information table.

Step S64 is a process for returning to step S62 and obtaining subsequent "rear information" when there remains "rear information" for which a process in step S63 is not executed. Step S65 is a process for returning to step S61 and obtaining subsequent "front information" when there remains "front information" for which processes in steps S62 and S63 are not executed. In this way, new lines to be plotted are determined.

Figure 26:
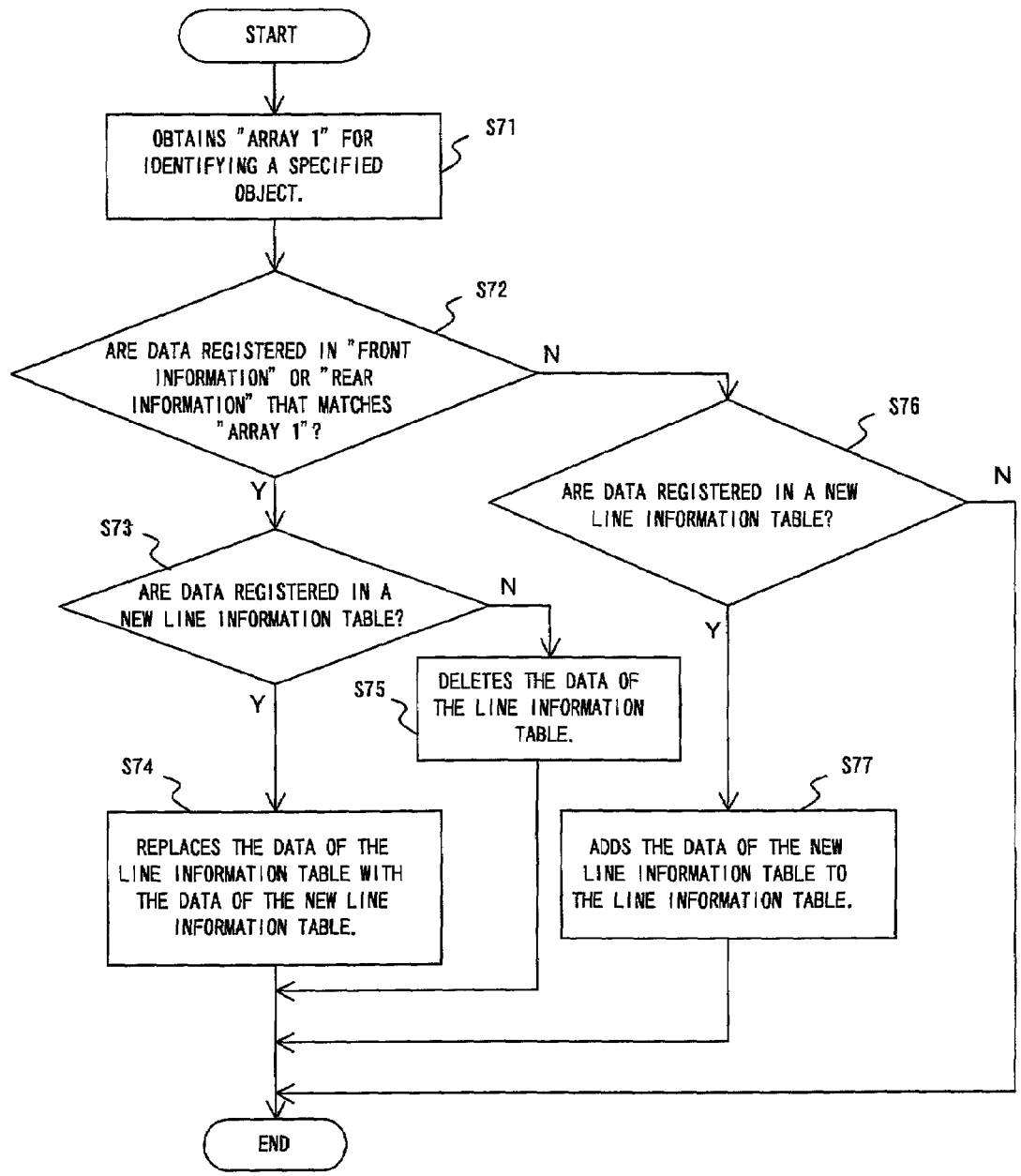
FIG. 26 is a flowchart showing a process of updating a line information table.

FIG. 26 is a flowchart showing a process of updating a line information table. This process corresponds to the process in step S36 shown in FIG. 22. In step S71, "array 1" for identifying an object specified in an object information table is obtained. In step S72, it is checked whether there is "front information" or "rear information" that matches "array 1" obtained in step S71.

If there is "front information" or "rear information" that matches "array 1", in step S73, it is checked whether data are registered in a new line information table. If data are registered in the new line information table, instep S74, the data of records in the line information table registering "front information" or "rear information" that matches "array 1" are replaced with the data of the new line information table. If data are not registered in the new line information table, in step S75, records in the line information table registering "front information" or "rear information" that matches "array 1" are deleted.

If there is neither "front information" nor "rear information" that matches "array 1", in step S76, it is checked whether data are registered in the new line information table. If data are registered in the new line information table, in step S77, the data of the new line information table are added to the line information table.

In this way, new lines to be plotted are registered in the line information table. In this case, lines, the display of which is made unnecessary by deleting the object selected by a user, are deleted from the line information table.

FIG. 27 is a flow chart showing a deletion process. This process corresponds to the process in step S37 shown in FIG. 22. In step S81, a record corresponding to a specified object is deleted from an object information table. In step S82, a record corresponding to a specified object is deleted from a data table. In step S83, a new line information table is cleared (initialized). In step S84, a front information table is cleared. In step S85, a rear information table is cleared. In step S86, a selection table is cleared. In this way, information for displaying an object selected by a user is deleted.

THE THIRD EXAMPLE

In the first and second examples described above, a graphic is displayed using a virtual coordinate system, and each object is located in each box provided by virtual coordinates. However, in the third example, a graphic is displayed using a coordinate system (hereinafter called "absolute coordinates") corresponding to the structure of a screen for displaying the graphic plotted by the graphic editing software.

Figure 28:
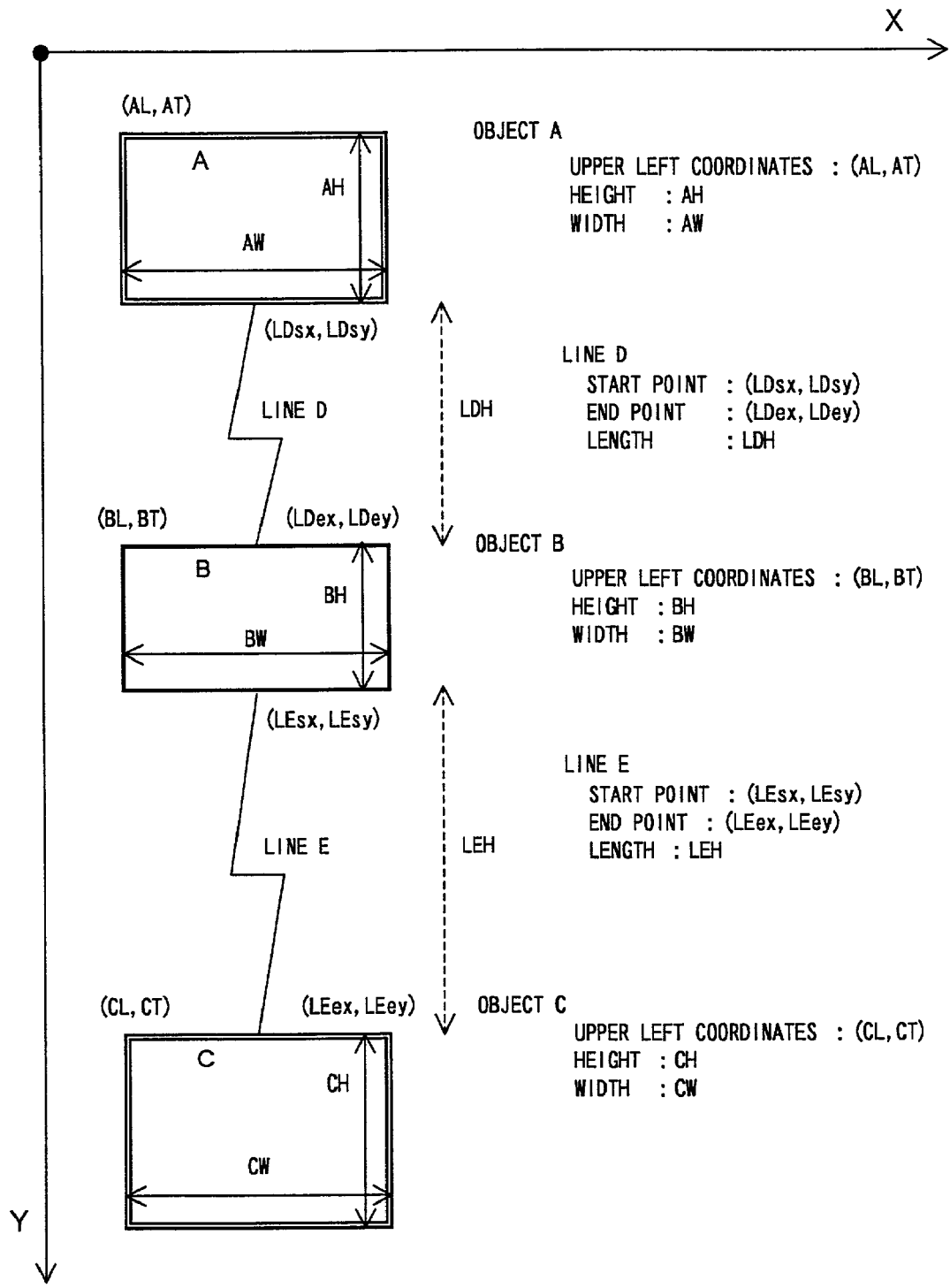
FIG. 28 shows an example of a graphic displayed using absolute coordinates.

FIG. 28 shows an example of a graphic displayed using absolute coordinates. This graphic contains objects A–C. Objects A and B are connected by line D. Objects B and C are connected by line E. In this example, all the objects are assumed to be rectangles. Information for displaying an object includes coordinate data in the upper left corner, and height data and width data of each object. Information for indicating the position of an object is not limited to coordinates in the upper left corner of each object, and for example, the coordinates of the center of each object can be used. Information for indicating a line includes the start point coordinate data, end point coordinate data and length data of each line. In the example shown in FIG. 28, although length data are indicated by the difference in the Y-coordinate between start and end points, in a graphic where objects are horizontally connected, length data are indicated by the difference in the X-coordinate between start and end points.

It is assumed that object B is deleted in the graphic described above. According to the method of the third example, if object B is deleted, only either line D or E is deleted. For example, if line D is deleted, objects A and C are connected by line E by shifting of line E and object C toward object A. If line E is deleted, objects A and C are connected by line D by shifting of object C toward object A.

Figure 29:
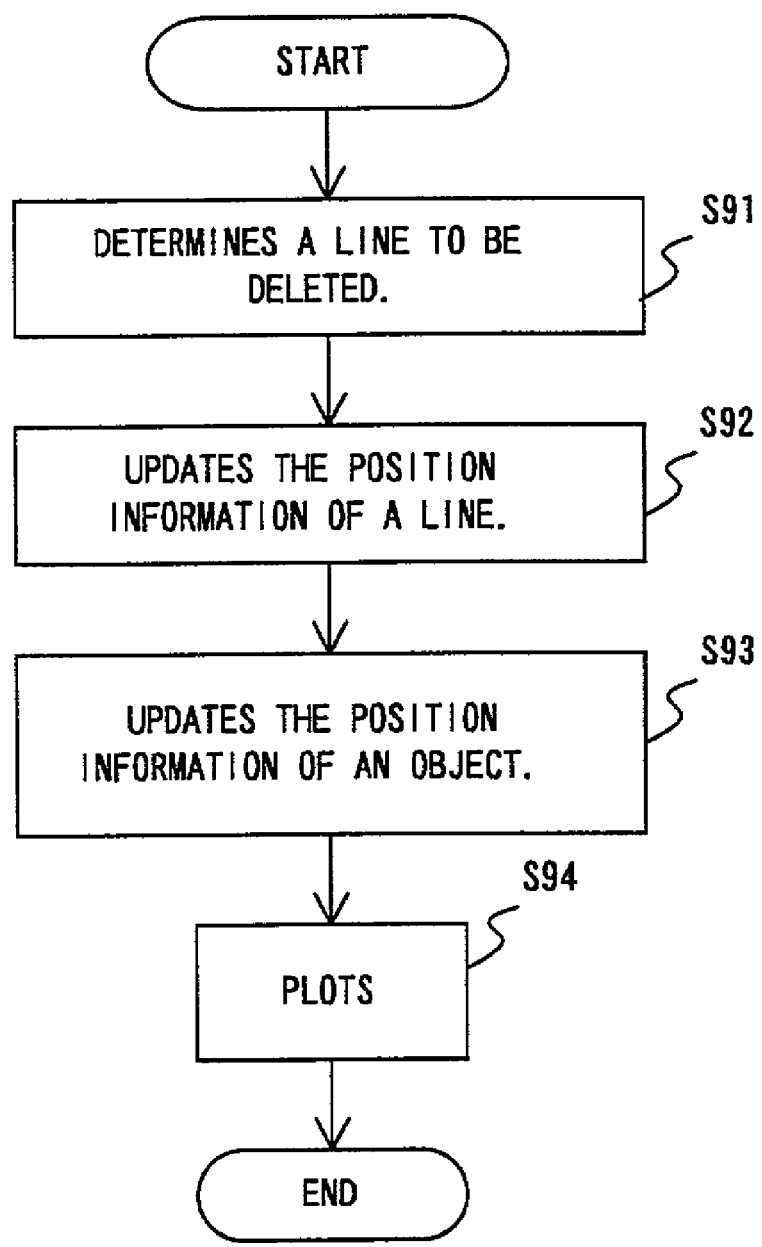
FIG. 29 is a basic flowchart showing the deletion process of the third embodiment.

FIG. 29 is a basic flowchart showing the object deletion process of the third example. The process shown by this flowchart is executed when a user selects an object.

In step S91, lines to be deleted are determined. A line to be deleted that is connected to an object selected by a user is determined based on "line length" or "line length+size of object to be deleted". If a line to be deleted is determined based on "line length" when object B is deleted in the graphic shown in FIG. 28, lines "LDH" and "LEH" are compared, and the shorter one is deleted. If a line to be deleted is determined based on "line length+size of object to be deleted", "LDH+BH" and "LEH+BH" are compared, and a line with the smaller value is deleted.

In step S92, position information for indicating a position where a line is plotted is updated. In this case, if objects are vertically connected in a graphic, the Y-coordinate is updated. If they are horizontally connected, the X-coordinate is updated. A line, whose display position should be updated, is basically provided below the object to be deleted.

In step S93, position information for indicating a position where an object is displayed is updated. In this case, if objects are vertically connected in a graphic, the Y-coordinate is updated. If they are horizontally connected in a graphic, the X-coordinate is updated. An object, whose display position is updated, is basically located below the object to be deleted. Then, in step S94, a graphic is plotted according to the position information updated in steps S92 and S93.

Specific examples are shown below.

(1) In case "LDH"<"LEH"

In this case, line D is deleted. Then, line E and object C are shifted by "length of line D+height of object B". Specifically, display information about line E is updated as follows.

Startpoint: (LEsx, LEsy)→(LEsx, LEsy-LDH-BH)
End point: (LEex, LEey)→(LEex, LEey-LDH-BH)
Length: LEH→LEH Display Information about Object C is Updated as Follows.
Upper left coordinates: (CL, CT)→(CL, CT-LDH-BH)
Height: CH→CH
Width: Cw→Cw (2) In case "LDH">"LEH"

In this case, line E is deleted. Then, object C is shifted by "length of line E+height of object B". Specifically, display information about object C is updated as follows.

Upper left coordinates: (CL, CT)→(CL, CT-LEH-BH)
Height: CH→CH
Width: Cw→Cw (3) In case "LDH"="LEH"

In this case, either (1) or (2) is executed according to a predetermined algorithm.

In this way, in the first and second examples, when a specific object is deleted, all lines connected to the object are deleted and new lines connecting the remaining objects with one another are generated. However, in the third example, the number of lines to be deleted following the object deletion is a minimal.

In the first to third examples, if a plurality of objects are connected in series below an object to be deleted, the display positions of the plurality of objects connected in series are all shifted following the object deletion, which is not explained in order to simplify the description.

Figure 30A:
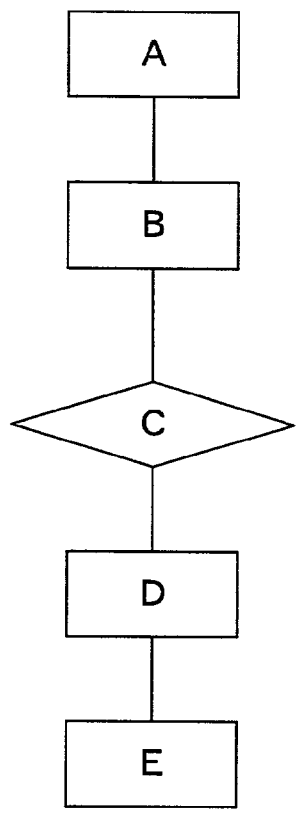
FIGS. 30A–30C show examples of deletion processes required when a plurality of objects are connected in series below an object to be deleted.
Figure 30B:
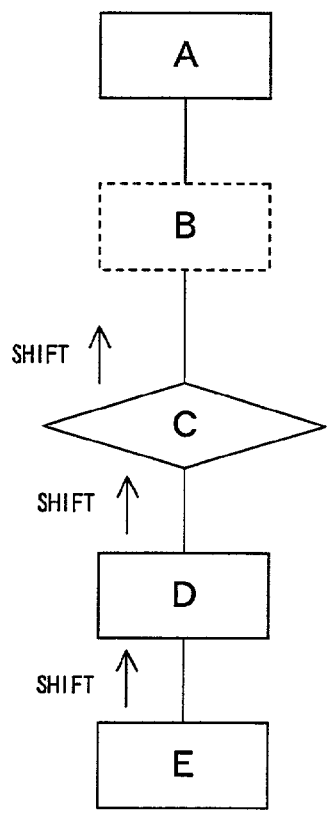

For example, a graphic shown in FIG. 30A is taken. In this graphic, objects A–E are connected in series. In this case, as shown in FIG. 30B, if object B is deleted, objects C–E are all shifted upward. In this case, the graphic editing software executes the following processes when recognizing the selection of object B.

(1) The graphic editing software refers to a data table and detects a record registering object B as "preceding information".
(2) The software refers to the data table and searches for a record registering the object detected in (1) described above as "preceding information".

(3) When a record is detected in (2) described above, the software returns to (2) and further searches for subsequent records.

Figure 30C:
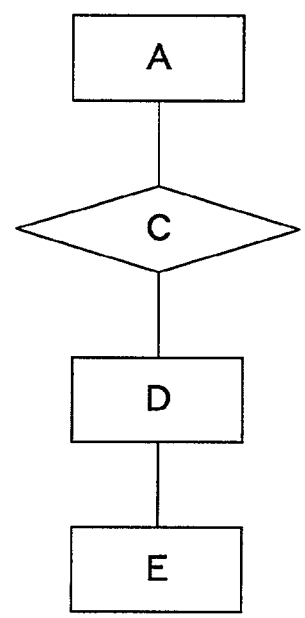

In the example shown in FIG. 30B, object C is detected in (1), and objects D and E are detected by repeating (2) and (3) described above. Then, object B is deleted from an object information table and "Y-coordinates" of objects C–E are updated in the data table. In this case, it is assumed that a line connecting objects A and C is registered in a line information table. In this way, a graphic shown in FIG. 30C is displayed.

Figure 31A:
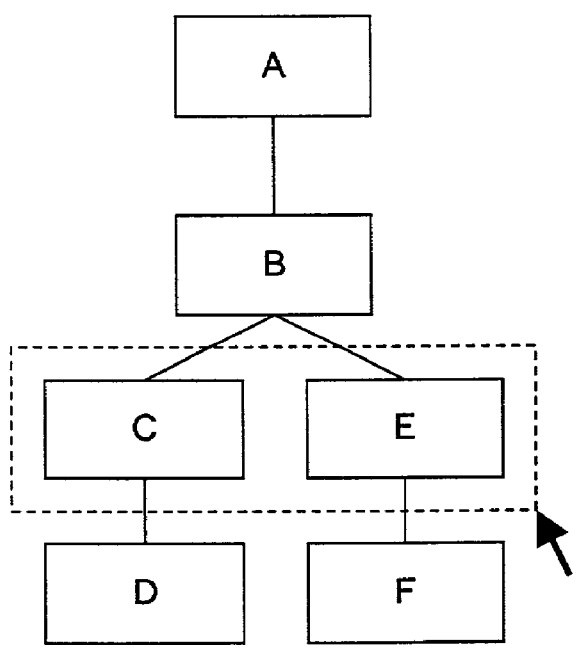
FIGS. 31A and 31B show processes required when a plurality of objects are simultaneously selected.
Figure 31B:
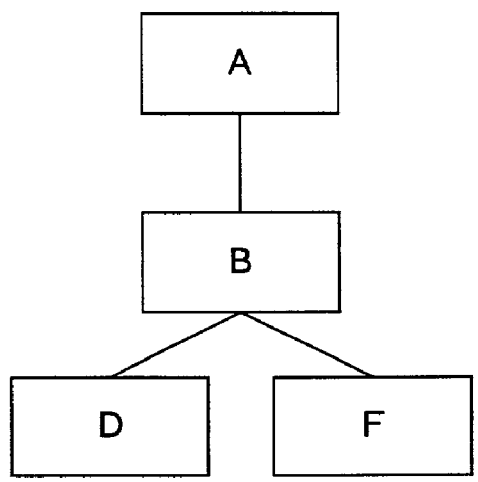

If a plurality of objects are simultaneously deleted, a user selects a range containing the plurality of objects, for example, using a mouse, etc., as shown in FIG. 31A, which is not shown in the example described above. In this example, objects C and E are simultaneously selected. If a plurality of objects are simultaneously selected by a user in this way, the graphic editing software registers the plurality of objects in the selection table. Then, the software executes the processes described above for each object. Specifically, objects B and D are connected by deleting object C, and objects B and F are connected by deleting object D. In this way, a graphic shown in FIG. 31B is obtained.

The Second Embodiment

According to the editing method of the first embodiment described above, if a user wants to delete an object, the user must select an object to be deleted and designate the execution of a deletion process. However, according to the editing method of the second embodiment, the object is deleted by moving a target object to be deleted to a prescribed position. In this case, the sequence (connection order) of the remaining objects, which was defined before the deletion of the target object, is maintained.

FIGS. 32A and 32B show the editing method of the second embodiment. According to this editing method, the graphic editing software provides (displays) a discard area 31 on the display screen. Then, when a component, including an object and a line, that composes a graphic is located in the discard area 31, the graphic editing software deletes the component.

It is assumed that object B is deleted from the graphic shown in FIG. 32A. In this case, for example, as shown in FIG. 32B, a user drags object B and drops the object in the discard area 31. When detecting the overlap of the discard area 31 and object B, the graphic editing software deletes object B and simultaneously connects objects A and C, as shown in FIG. 32C.

Figure 33A:
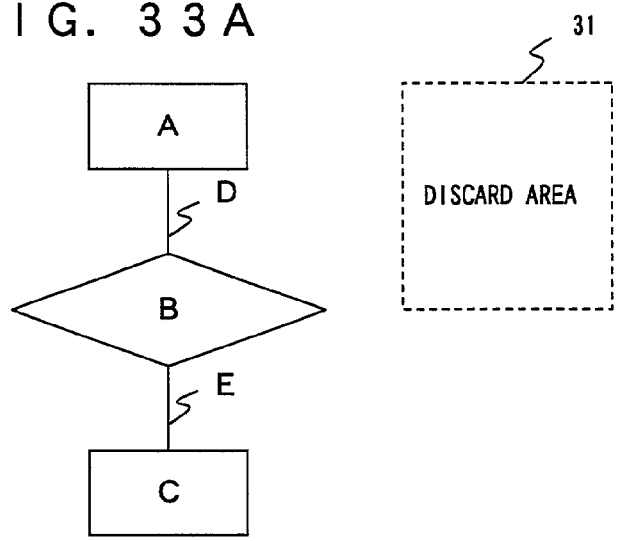
FIGS. 33A–33C show how to edit in the second embodiment (No. 2).
Figure 33B:
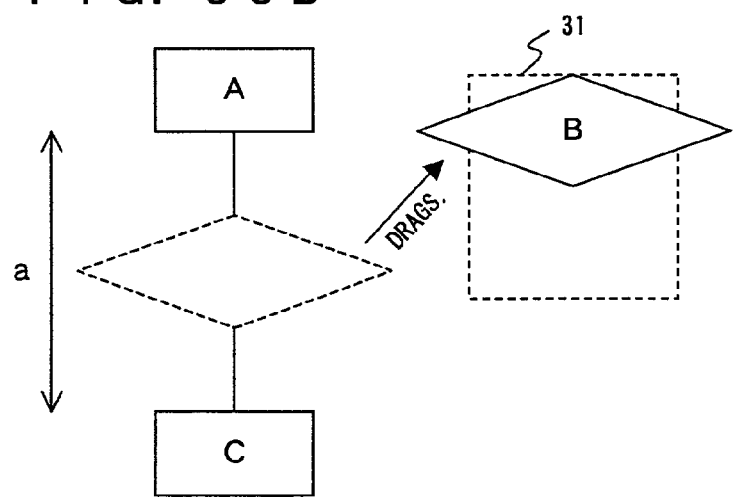
Figure 33C:
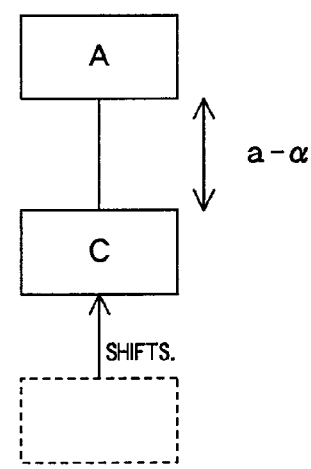

If the distance between objects remaining after the deletion of a specific object is too large, the graphic editing software modifies the distance between the objects appropriately by modifying the positions of the objects. For example, as shown in FIGS. 33A and 33B, if the distance between objects A and C is larger than a predetermined value when object B is dragged and dropped in the discard area 31, the graphic editing software shifts object C in such a way that the distance can become an appropriate value (a-α). In this way, a graphic shown in FIG. 33C is obtained.

Figure 34A:
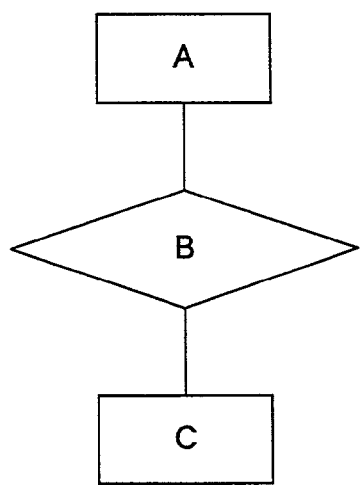
FIGS. 34A–34C show how to edit in the second embodiment (No. 3).
Figure 34B:
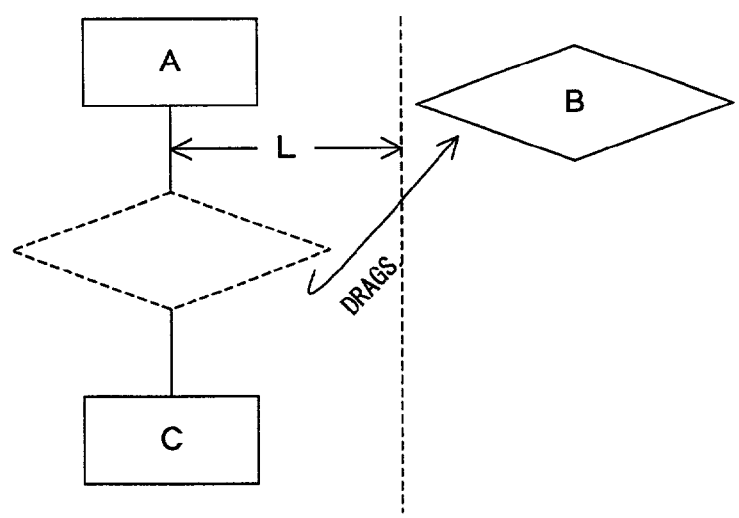
Figure 34C:
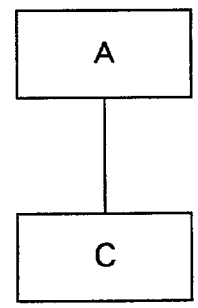

Although in the examples shown in FIGS. 32 and 33, it is confirmed that a deletion process is executed when a target object is dropped in a predetermined area, the editing method of the second embodiment is not limited to this. For example, as shown in FIGS. 34A–34C, the system can also be configured in such a way that an object can be automatically deleted if aa target object in a graphic is moved to a position farther away from the graphic than a prescribed distance L.

FIG. 35A shows an example of the object information table of the second embodiment. An object information table stores position coordinates where each object is displayed, information for indicating the shape of each object, etc. As "coordinates", absolute coordinates in the upper left corner of each object or at the center coordinates of each object are stored. For "shape", basically, information for identifying a graphic component provided by application software is used. Application software provides, for example, a rectangle, a diamond, a circle, etc. Furthermore, as specific information for indicating the shape of each object, the "height", "width", etc., of an object are stored.

FIG. 35B shows an example of the line information table of the second embodiment. A line information table stores a position where each line is plotted, information for specifying the shape and information for indicating the connection order among objects. "Start point coordinates" and "end point coordinates" are the coordinates at the start point and end point of each line, respectively. "Front information" and "rear information" are the same as those described in the first embodiment, which are information for specifying objects connected ahead of each line and information for specifying objects connected behind each line, respectively. The cross point of each line and its front side object is "start coordinates". The cross point of each line and its rear side object is "end coordinates". Furthermore, "height" indicates the difference in the Y-coordinate between the start and end points of each line.

The flow of a plurality of objects is managed using this line information table. For example, in a table shown in FIG. 35B, it is registered that object B is subordinate to object A and that object C is subordinate to object B.

Figure 36:
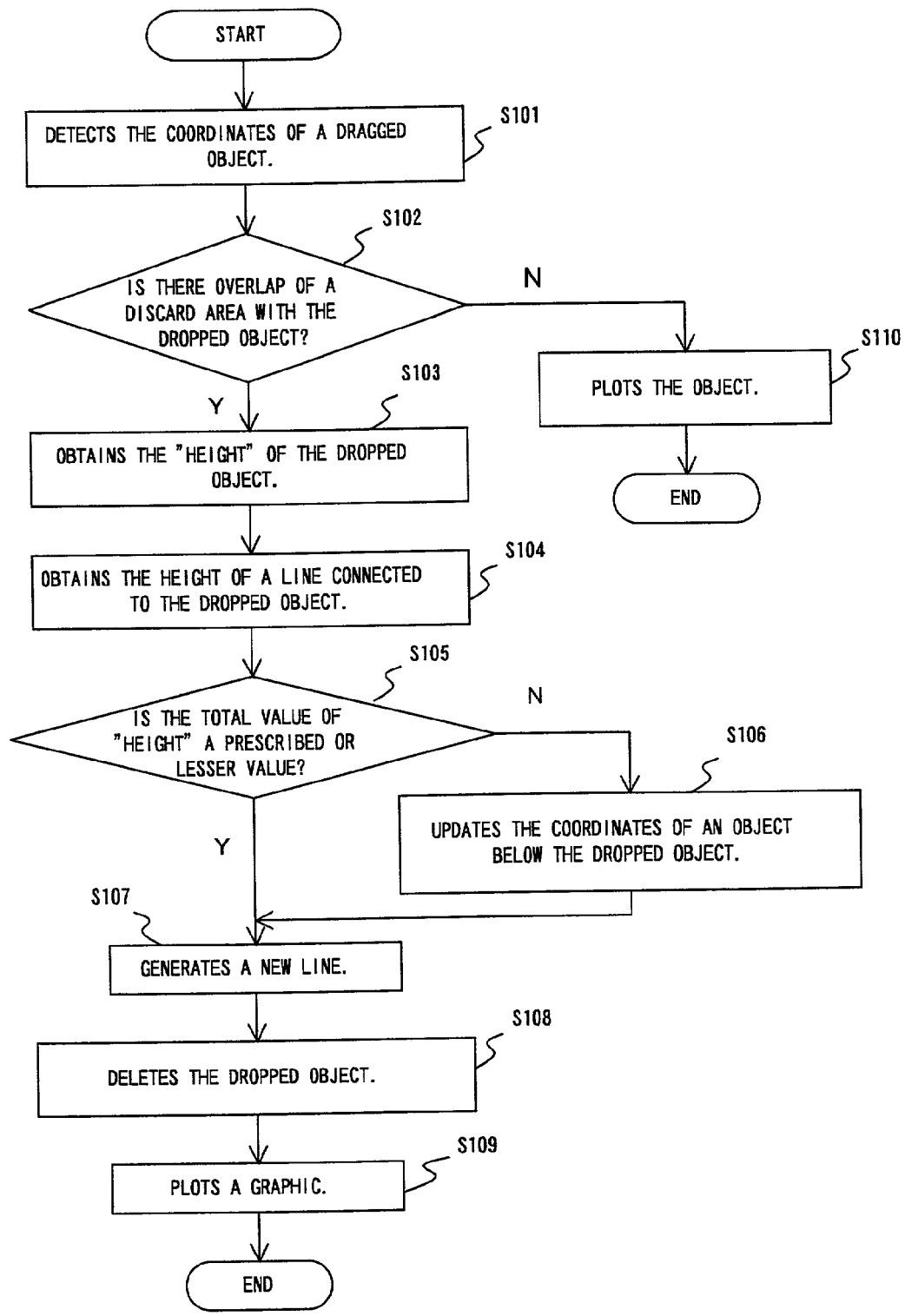
FIG. 36 is a flowchart showing the operation of the graphic editing software of the second embodiment.

FIG. 36 is a flowchart showing the operation of the graphic editing software of the second embodiment. The process shown by this flowchart is executed when a user drags a target object. A case where object B is deleted is described below with reference to FIGS. 32 and 33.

In step S101, the graphic editing software tracks and detects the position of an object dragged by a user. In step S102, the software detects a position where the object is dropped and checks whether the object overlaps a discard area. The graphic editing software recognizes the display position of the discard area. Then, if the object overlaps the discard area, the flow proceeds to step S103. On the other hand, if the object does not overlap the discard area, in step S110, the software plots the object. Step S110 corresponds to a so-called "move" process.

In step S103, the graphic editing software refers to an object information table and obtains the "height" of the object dropped in the discard area. In step S104, the software refers to a line information table and obtains the "height" of each line connected to the object dropped in the discard area. In the examples shown in FIGS. 32 or 33, "BH (height of object B)" is obtained by the process in step S103, and "DH (height of line D)" and "EH (height of line E)" are obtained by the process in step S104.

In step S105, the graphic editing software calculates the total value of "heights" obtained in step s103 and S104, and checks whether the total value is equal to or less than a predetermined threshold value. Then, if the total value is larger than the threshold value, in step S106, the software updates the coordinates of objects connected below the object dropped in the discard area. The updated coordinates are registered in the object information table. If the total value is equal to the threshold value or less, step S106 is skipped.

In step S107, the graphic editing software generates line information about a line connecting between an object located above the target object and an object located below the target object. In this way, for example, a line with "front information=object A" and "rear information=object C" is registered in the line information table. In step S108, in the object information table, a record corresponding to the object dropped in the discard area is deleted. Then, in step S109, the software plots a graphic according to the object information table and line information table.

The flowchart shown in FIG. 36 indicates a case where a deletion process is executed by checking whether a target object has been dropped in the discard area. However, if a deletion process is executed by checking whether a target object is moved farther away from a graphic than a predetermined distance, a step of checking whether the distance between the moved object and the graphic exceeds the prescribed distance can be set instead of step S102.

In the examples of the first and second embodiments, the description has been given using a flowchart as an example of a graphic to be edited. However, the present invention is not limited to this, and includes a method of editing a graphic, etc., in which a plurality of objects are connected or linked by lines or connectors. For example, the present invention is also applicable to a method of creating or editing a circuit diagram. In this case, each element composing a circuit is an "object" and a signal line connecting the elements is a "line".

Furthermore, although FIGS. 32 and 33 show states where one object is connected above and below, respectively, an object to be deleted, two or more objects can also be connected. This means that the flow is branched in the case of a flowchart and that two or more elements are connected in the case of a circuit diagram. The connection orders are also managed by the object information table and the line information table shown in FIG. 35 and as in the connection order described above. In this case, a deletion process is executed while the connection order is maintained.

Figure 37:
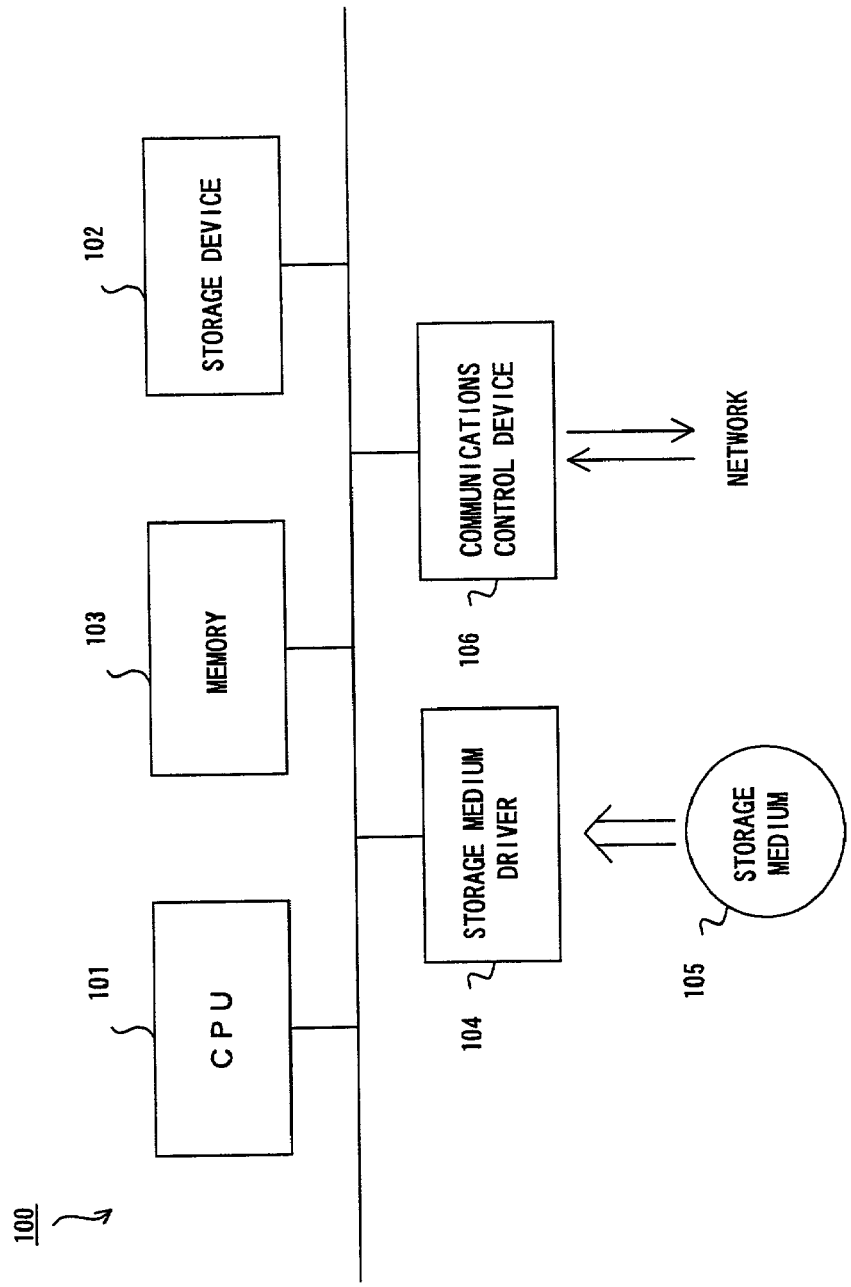
FIG. 37 shows the configuration of a computer for executing a program which describes the editing method of the present invention.

The graphic editing function of the present invention is implemented by enabling a computer to execute a program which describes the process shown in the flowchart described above. FIG. 37 shows a block diagram of a computer 100 for executing the program.

A CPU (central processing unit) 101 executes the program which describes process shown in the flowchart by loading the program into a memory 103. For a storage device 102, for example, a hard disk is used, and the storage device 102 stores the program. For the memory 103, for example, a semiconductor memory is used, and the memory 103 can be used as the working area of the CPU 101. The variety of tables are generated in this memory 103.

A storage medium driver 104 accesses a portable storage medium 105 according to the instruction of the CPU 101. For the portable storage medium 105, a semiconductor device, such as an IC card, etc., a medium to/from which information is inputted/outputted by a magnetic function, such as a floppy disk, a magnetic disk, etc., and a medium to/from which information is inputted/outputted by an optical function, such as an optical disk, etc., can be used. A communications control device 106 transmits/receives data to/from a network according to the instruction of the CPU 101.

Figure 38:
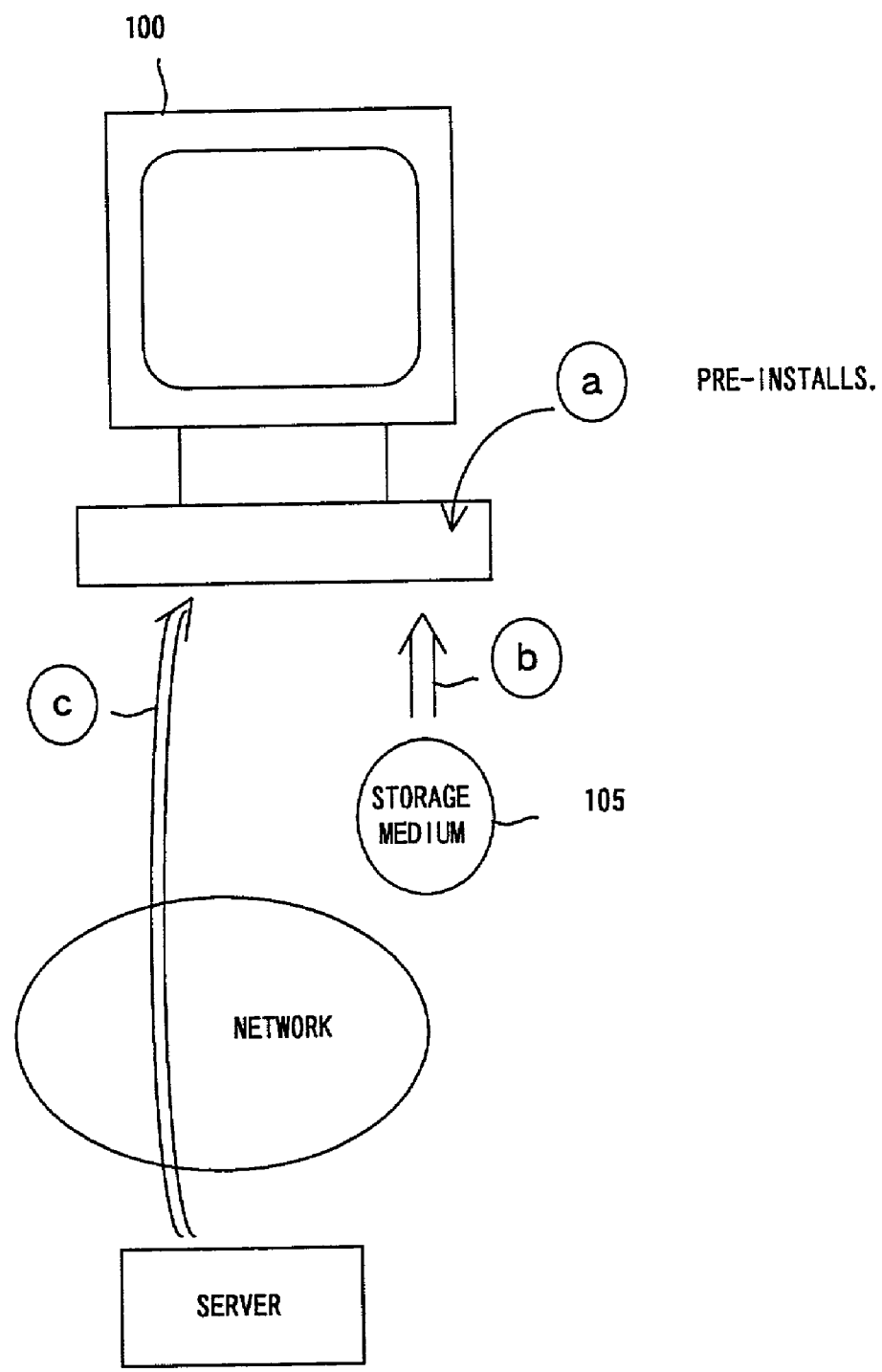
FIG. 38 shows how to provide the software program of the present invention.

FIG. 38 shows how to provide the software program, etc., of the present invention. The programs of the present invention can be provided, for example, by any of the following three methods, A: The program, etc., is installed in the computer 100. In this case, the program, etc., is installed, for example, prior to shipment.
B: The program, etc., is stored in and provided to the portable storage medium 105. In this case, the program, etc., stored in the portable storage medium is basically installed in the storage device 102 via the storage medium driver 104.
C: The program, etc., is provided from a server in a network. In this case, the computer can obtain the program, etc., by downloading it from the server.

When a graphic, etc., is generated/edited using a computer while displaying the graphic, etc., the process of deleting an object from a graphic which includes a plurality of objects connected with one another is simplified. Therefore, a user's load can be reduced and work efficiency can be improved. In addition, a possibility that an error may occur when a graphic, etc., is edited, can also be reduced.

What is claimed is:

1. A graphic editing device, comprising:
a display unit to display a graphic including a first object, a second object and a third object that are connected in series via lines;
a storage unit, coupled to said display unit, to store a first table with position information that indicates a position of each object displayed on said display unit, a second table with line information that identifies the lines connecting the first, second and third objects, and a third table with preceding information that identifies an object preceding each object, if any; and
an editor, coupled to said display unit and said storage unit, to delete the second object and to connect the first and third objects according to contents of the first, second and third tables in said storage unit, when the second object is selected, said editor adjusting a position of at least one of the first and third objects on said display unit to adjust a distance between the first and third objects, if the distance between the first and third objects after the second object is deleted is larger than a predetermined threshold.

2. The graphic editing device according to claim 1, wherein said editor displays the third object in a position where the second object used be displayed when the second object is selected and deleted.

3. The graphic editing device according to claim 1,
further comprising a coordinate system providing unit providing a virtual coordinate system in which each box is defined as an area for displaying an object,
wherein said display unit displays each object using the virtual coordinate system and said editor locates each object using the virtual coordinate system.

4. A graphic editing device, comprising:
a display unit displaying a graphic including a plurality of first objects, a second object connected to the plurality of first objects and a plurality of third objects connected to the second object; and
an editor deleting the second object and separately connecting each of the plurality of first objects and each of the plurality of third objects automatically when the second object is selected.

5. A graphic editing device, comprising:
a display unit displaying a graphic including a first object, a second object and a third object that are connected in series; and
an editor automatically deleting the second object and connecting the first and third objects, when the second object is selected and dragged from the graphic to a predetermined area positioned away from the graphic to thereby indicate that the selected and dragged second object is to be deleted from the graphic.

6. The graphic editing device according to claim 5, wherein said editor automatically corrects a distance between the first and third objects according to a predetermined condition.

7. The graphic editing device according to claim 5, further comprising a management unit managing a sequence of the objects, said management unit manages the third object as a subordinate object to the first object, if the second object is subordinate to the first object and the third object is subordinate to the second object before the second object is deleted.

8. A graphic editing device, comprising:
a display unit displaying a graphic including a first object, a second object and a third object that are connected in series; and
an editor automatically deleting the second object and connecting the first and third objects, when the second object is selected and dragged to a specific relative position from a position of the graphic to thereby indicate that the selected and dragged second object is to be deleted from the graphic.

9. A graphic editing method, comprising:
displaying a first object, a second object and a third object that are connected in series via lines;
storing in a first table position information which indicates a position of each object displayed;
storing in a second table line information which identifies the lines connecting the first, second and third objects;
storing in a third table preceding information which identifies an object preceding each object, if any; and
deleting the second object and connecting the first and third objects according to contents of the first, second and third tables, when the second object is selected, said editor adjusting a position of at least one of the first and third objects on said display unit to adjust the distance between the first and third objects, if the distance between the first and third objects after the second object is deleted is larger than a predetermined threshold.

10. A graphic editing method, comprising:
displaying a first object, a second object and a third object that are connected in series; and
automatically deleting the second object and connecting the first and third objects, when the second object is selected and dragged to a predetermined area positioned away from the connected first, second and third objects to thereby indicate that the selected and dragged second object is to be deleted and no longer directly connected to the first and third objects or indirectly connected to the first and third objects through other objects.

11. A storage medium that stores a program to control a computer to perform a process comprising:
displaying a graphic including a first object, a second object and a third object that are connected in series via lines;
storing in a first table position information which indicates a position of each object displayed;
storing in a second table line information which identifies the lines connecting the first, second and third objects;
storing in a third table preceding information which identifies an object preceding each object, if any; and
deleting the second object and connecting the first and third objects according to contents of the first, second and third tables, when the second object is selected, said editor adjusting a position of at least one of the first and third objects on said display unit to adjust the distance between the first and third objects, if the distance between the first and third objects after the second object is deleted is larger than a predetermined threshold.

12. A storage medium that stores a program executed by a computer, the program comprising:
a program code of displaying a graphic including a first object, a second object and a third object that are connected in series; and
a program code automatically deleting the second object and connecting the first and third objects, when the second object is selected and dragged from the graphic to a predetermined area positioned away from the graphic to thereby indicate that the selected and dragged second object is to be deleted from the graphic.

13. A graphic editing device, comprising:
displaying means for displaying a graphic including a first object, a second object and a third object that are connected in series via lines;
first table means for storing position information which indicates a position of each object displayed on said display unit;
second table means for storing line information which identifies the lines connecting the first, second and third objects;
third table means for storing preceding information which identifies an object preceding each object, if any; and
editing means for deleting the second object and connecting the first and the third objects according to contents of said first, second and third table means, when the second object is selected, said editor adjusting a position of at least one of the first and third objects on said display unit to adjust the distance between the first and third objects, if the distance between the first and third objects after the second object is deleted is larger than a predetermined threshold.

14. A graphic editing device, comprising:
displaying means for displaying a graphic including a first object, a second object and a third object that are connected in series; and
editing means for automatically deleting the second object and connecting the first and third objects, when the second object is selected and dragged from the graphic to a predetermined area positioned away from the graphic to thereby indicate that the selected and dragged second object is to be deleted from the graphic.

* * * * *